(12) United States Patent
Nguyen et al.

(10) Patent No.: US 12,541,872 B2
(45) Date of Patent: Feb. 3, 2026

(54) DETERMINATION OF DROPLET CHARACTERISTICS

(71) Applicants: Raven Industries, Inc., Sioux Falls, SD (US); South Dakota State University, Brookings, SD (US)

(72) Inventors: Kim-Doang Nguyen, Brookings, SD (US); Praneel Acharya, Brookings, SD (US); Travis Allen Burgers, Sioux Falls, SD (US)

(73) Assignees: Raven Industries, Inc., Sioux Falls, SD (US); South Dakota State University, Brookings, SD (US)

( * ) Notice: Subject to any disclaimer, the term of this patent is extended or adjusted under 35 U.S.C. 154(b) by 341 days.

(21) Appl. No.: 18/054,830

(22) Filed: Nov. 11, 2022

(65) Prior Publication Data

US 2023/0154035 A1    May 18, 2023

Related U.S. Application Data

(60) Provisional application No. 63/314,042, filed on Feb. 25, 2022, provisional application No. 63/278,773, filed on Nov. 12, 2021.

(51) Int. Cl.
*G06T 7/70* (2017.01)
*G01N 15/14* (2024.01)
(Continued)

(52) U.S. Cl.
CPC .......... *G06T 7/70* (2017.01); *G01N 15/1434* (2013.01); *G06T 5/20* (2013.01); *G06T 5/70* (2024.01);
(Continued)

(58) Field of Classification Search
CPC .... G06T 7/70; G06T 7/62; G06T 5/70; G06T 5/20; G06T 2207/10016;
(Continued)

(56) References Cited

U.S. PATENT DOCUMENTS 3,248,463 A    4/1966  Wiley et al.
7,311,004 B2   12/2007 Giles
(Continued)

FOREIGN PATENT DOCUMENTS

AU    2019277193    10/2020
DE    102016109406   11/2017
(Continued)

OTHER PUBLICATIONS

Durve, Mihir, et al. "A fast and efficient deep learning procedure for tracking droplet motion in dense microfluidic emulsions." arXiv preprint arXiv:2103.01572. Mar. 2, 2021. (Year: 2021).*
(Continued)

*Primary Examiner* — Tracy Mangialaschi
(74) *Attorney, Agent, or Firm* — Schwegman Lundberg & Woessner, P.A.

(57) ABSTRACT

A system and method for the detection and tracking of droplets sprayed from an agricultural spray nozzle is provided. The system includes a sensor configured to observe droplets sprayed from the nozzle, a frame extractor module, a droplet shape and size extraction module, a droplet tracking module, and a data log module. The system may provide an artificial intelligence (AI)-enabled framework capable of processing images obtained of droplets, detecting and tracking all droplets appearing across image frames, and determining the droplets' geometric and dynamic data. The system further provides for the integration of deep-learning techniques into an image processing algorithm which enables precise and reliable determination of droplet char-
(Continued)

Figure 1A:
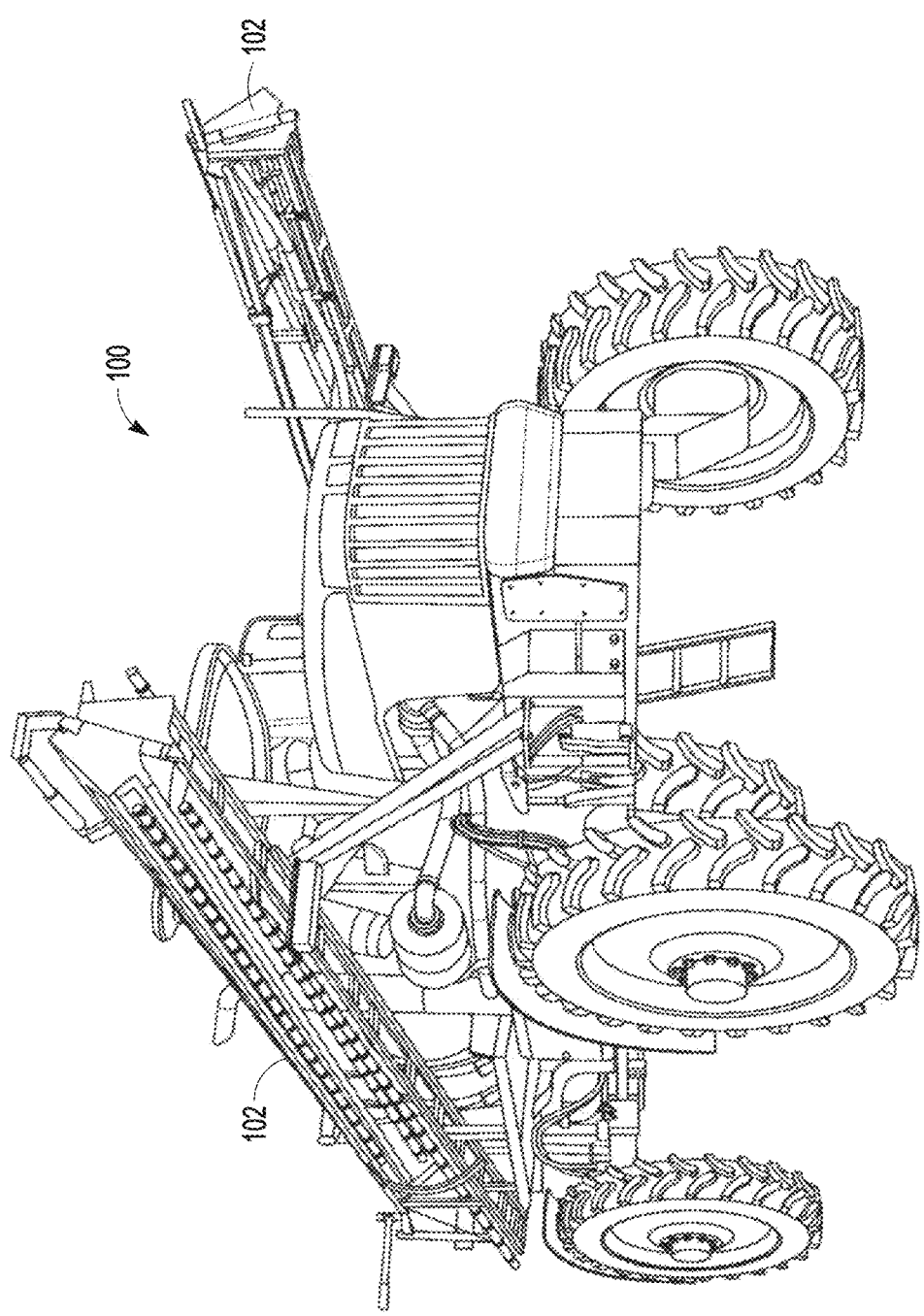

acteristics. In addition, the deep-learning framework produces consistent results under a variety of uncertain imaging conditions.

23 Claims, 20 Drawing Sheets

(51) Int. Cl.
| | | |
|---|---|---|
| *G01N 15/1434* | (2024.01) | |
| *G06T 5/20* | (2006.01) | |
| *G06T 5/70* | (2024.01) | |
| *G06T 7/62* | (2017.01) | |
| *G06V 10/44* | (2022.01) | |
| *A01C 23/00* | (2006.01) | |
| *A01M 7/00* | (2006.01) | |

(52) U.S. Cl.
CPC .............. *G06T 7/62* (2017.01); *G06V 10/443* (2022.01); *A01C 23/007* (2013.01); *A01M 7/0089* (2013.01); *G01N 2015/1493* (2013.01); *G01N 2015/1497* (2013.01); *G06T 2207/10016* (2013.01); *G06T 2207/20081* (2013.01); *G06T 2207/20084* (2013.01)

(58) Field of Classification Search
CPC ........... G06T 2207/20084; G06T 2207/20081; G06V 10/443; G01N 15/1434; G01N 2015/1493; G01N 2015/1497; A01C 23/007; A01M 7/0089; A01M 7/0096
See application file for complete search history.

(56) References Cited

U.S. PATENT DOCUMENTS

| 10,656,066 | B2 | 5/2020 | Sarkar et al. | |
|---|---|---|---|---|
| 2015/0367358 | A1 | 12/2015 | Funseth et al. | |
| 2021/0252541 | A1 | 8/2021 | Harmon et al. | |
| 2021/0289693 | A1* | 9/2021 | Harmon | B05B 1/20 |
| 2022/0124962 | A1 | 4/2022 | Long et al. | |
| 2024/0306629 | A1 | 9/2024 | Kocer et al. | |

FOREIGN PATENT DOCUMENTS

| EP | 3248463 | A1 | 11/2017 |
|---|---|---|---|
| EP | 3742882 | | 10/2023 |
| WO | WO-2023278009 | A1 | 1/2023 |
| WO | 2023086963 | | 5/2023 |

OTHER PUBLICATIONS

Kumar, S. Santosh, et al. "Automated droplet size distribution measurements using digital inline holography." Journal of aerosol science 137 (2019): 105442. (Year: 2019).*
Lu, Shizhou, et al. "A novel approach to droplet's 3D shape recovery based on mask R-CNN and improved Lambert-Phong model." Micromachines 9.9 (2018): 462. (Year: 2018).*
McNearney, E. J. "Analysis of droplet-target interactions in electrostatically charged spraying systems." (2020). (Year: 2020).*
Madsen, Jesper, "Measurement of droplet size and velocity distributions in sprays using Interferometric Particle Imaging (IPI) and Particle Tracking Velocimetry (PTV)", Proceedings 9th International Conference on Liquid Atomization and Spray Systems—ICLASS 2003, (Jan. 2003), 9 pgs.
"International Application Serial No. PCT US2022 079753, International Search Report mailed Mar. 3, 2023", 6 pgs.
"International Application Serial No. PCT US2022 079753, Written Opinion mailed Mar. 3, 2023", 7 pgs.
Kumar, S Santosh, "Automated droplet size distribution measurements using digital in line holography", Journal of Aerosol Science, Elsevier, Amsterdam, NL, vol. 137, (Aug. 14, 2019).
Mihir, Durve, "A fast and efficient deep learning procedure for tracking droplet motion in dense microfluidic emulsions", arxiv.org, Cornell University Library, 201 Olin Library Cornell University Ithaca, NY 14853, (Mar. 2, 2021).
Wang, Linhui, "A Smart Droplet Detection Approach With Vision Sensing Technique for Agricultural Aviation Application", IEEE Sensors Journal, IEEE, USA, vol. 21, No. 16, (Feb. 3, 2021), 17508-17516.
"International Application Serial No. PCT US2022 027707, International Preliminary Report on Patentability mailed Jan. 11, 2024", 11 pgs.
"U.S. Appl. No. 18/575,725, Supplemental Preliminary Amendment filed Jan. 16, 2024", 11 pgs.
"Australian Application Serial No. 2022300712, First Examination Report mailed Dec. 16, 2024", 3 pgs.
"International Application Serial No. PCT/US2022/079753, International Preliminary Report on Patentability mailed May 23, 2024", 9 pgs.
"Australian Application Serial No. 2022300712, Response filed Jun. 24, 2025 to First Examination Report mailed Dec. 16, 2024", 83 pages.
"Australian Application Serial No. 2022300712, Subsequent Examiners Report mailed Jul. 11, 2025", 3 pages.
"Canadian Application Serial No. 3,224,111, Examiners Rule 86(2) Report mailed May 8, 2025", 13 pages.

* cited by examiner

DETERMINATION OF DROPLET CHARACTERISTICS

CROSS-REFERENCE TO RELATED PATENT DOCUMENTS

This patent application claims the benefit under 35 U.S.C. § 119(e) of U.S. Provisional Patent Application 63/278,773, filed Nov. 12, 2021, and also claims the benefit under 35 U.S.C. § 119(e) of U.S. Provisional Patent Application 63/314,042, filed Feb. 25, 2022, the disclosures of which are hereby incorporated by reference herein in their entirety.

This patent application is related to U.S. Provisional Application No. 63/217,755 filed Jul. 1, 2021 and entitled SPRAYER NOZZLE MONITOR AND CONTROL SYSTEM AND METHODS FOR SAME, and is also related to U.S. Provisional Application No. 63/254,466 filed Oct. 11, 2021 and entitled SPRAYER NOZZLE MONITOR AND CONTROL SYSTEM AND METHODS FOR SAME, which are hereby incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc. of Sioux Falls, South Dakota, USA. All Rights Reserved.

TECHNICAL FIELD

This document pertains generally, but not by way of limitation, to the determination of droplet characteristics for sprayed application of agricultural products (fluid or gaseous).

BACKGROUND

Agricultural sprayers are used to distribute agricultural products, such as fertilizers, insecticides, herbicides and fungicides to crops. Agricultural sprayers include one or more sprayer booms that are long enough (e.g., 60 feet to 150 feet) to spray multiple rows of crops in a single pass. Each of the sprayer booms include multiple sprayer nozzles to distribute an agricultural product in a spray pattern.

SUMMARY

Sprayer nozzles are ubiquitous tools used to perform agricultural processes such as applying pesticides, other chemical treatments, or nutrients to crops. A problem with the current agricultural sprayer nozzles is that only a small percent of the spray sticks to the crop as intended (Massinon et al., 2017). Due to plants' hydrophobic properties, most of sprayed droplets bounce off plants, land on the ground, and become part of the runoff that flows to streams and rivers, potentially causing pollution. Damak et al. (2016) related the problem of droplets bouncing off plants to the sizes and velocities of the droplets sprayed by existing nozzles.

Current techniques to measure the properties of sprayed droplets are manual, imprecise, or expensive. For example, a simple estimation method is to spray colored water onto a white sheet, or a "patternator", then process the image of the patterns to arrive at a rough estimation of droplet sizes. Improved measurements can be obtained by replacing the white sheet with a glass plate coated with silicone oil, referred to as an immersion sampling method. However, immersion sampling is limited to droplets large enough to break the surface tension of the oil layer, and is less effective for detecting fine droplets sprayed from agricultural nozzles. More advanced techniques that use laser analyzers, such as a Fraunhofer diffraction method and a laser Doppler method, require complicated and delicate experiment set-ups, expertise with laser technologies, and are expensive to acquire. Accordingly, these techniques are difficult to implement in a rugged agricultural environment. Additionally, some of these techniques implement the subtraction of a background to detect droplets. For instance, a consistently colored background (e.g., green, white or the like) is provided. Droplets cause color variations relative to the background, and by virtually subtracting the background from the varied colors (e.g., with image processing) droplets are detected. The maintenance of a consistent background relative to a spray pattern is difficult in an agricultural environment. For instance, soil, crops, fences, the sky, bodies of water, livestock, implements and vehicles have varied colors that frustrate the maintenance of a consistent color for droplet detection.

Accordingly, these techniques depend on consistent and predictable environmental factors that are difficult to achieve in an agricultural environment. Characteristics including consistent colors, consistent and predictable lighting, solid mounts and minimal vibrations for instruments are preferred for droplet detection. Accordingly, sensing and analyzing droplets (e.g., location, size, shape, velocity or the like) in precision agricultural are outstanding problems.

In one example, enhanced nozzles are warranted to produce droplet sizes, velocities, spray patterns or the like (herein spray characteristics) that are effective for a variety of conditions (e.g., adhesion to plants, overcome the effect of winds or the like). Additionally, improvement in droplet monitoring (e.g., spray pattern, droplet profile, droplet vectors such as velocity or the like) for control of sprayer output and confirmation of delivery in agricultural environments is specified to implement control of enhanced nozzles as well as existing nozzles and associated sprayers. The present subject matter provides enhanced monitoring of sprayer output including identification of droplets, detection of droplet characteristics or the like.

The present inventors have recognized, among other things, that a problem to be solved can include enhancing detection and monitoring of spray droplets in agricultural environments, and detecting and addressing inconsistencies in the application of agricultural products in a spray pattern. The droplet characteristics of droplets (in some places referred to as droplet profile(s) having droplet characteristics) distributed in a spray pattern are determined by the present subject matter and the information is optionally used to enhance sprayer performance including, but not limited to, improved coverage of crops targeted by the sprayer.

In one example, agricultural product is applied with varied droplet sizes to address a first issue, such as spray drift. An operator may adjust spray tips or other sprayer settings to generate spray droplets that are larger than otherwise specified. The larger spray droplets have increased mass and are less affected by wind that may otherwise promote spray drift. The large spray droplets provide decreased coverage in some circumstances. For instance, the large droplets deflect from leaves, stalks or the like of targets (e.g., crops, weeds or the like). In contrast, smaller droplets provide a corresponding finer spray, and the droplets adhere to leaves or stalks more readily that larger droplets.

The present subject matter may optionally provide an artificial intelligence (AI)-enabled framework capable of processing images obtained of droplets, detecting and tracking all droplets appearing across image frames, and measuring the droplets' characteristics or profiles, such as geometric and dynamic data. The present subject matter further provides for the integration of deep-learning techniques into an image processing algorithm which enables precise and reliable measurement of droplet size and velocities (herein droplet characteristics, droplet profiles or the like). In addition, the deep-learning framework produces consistent results under a variety of uncertain imaging conditions including detection and monitoring of droplets in dynamic agricultural environments (in contrast to a predictable lab setting).

The present subject matter automates repetitive learning and discovery through analysis of high-speed video data of droplets, and can perform frequent, high-volume, computerized measurement and calculation tasks (in some places referred to as determination) reliably and without fatigue and labor cost. The approach adapts through progressive learning algorithms in which the AI system identifies structures and regularities in droplet imagery data to classify and predict the droplet characteristics, and the system adapts when given new droplet data. The deep-learning capability of the present subject matter can analyze larger and deeper droplet imagery data resulting in a precise and robust determination method, to determine droplet characteristics (or profiles) such as one or more of droplet sizes and velocities (e.g., through measurement, calculation, reference to previously identified structures and regularities, combinations of the same or the like). The determined droplet characteristics from the present subject matter are optionally incorporated into control of sprayer nozzles (e.g., automatic control) to provide for improved application of sprayed fluids to the target including but not limited to, adherence of the fluid, breadth of coverage, increased droplet size to mitigate the effect of wind based spray dispersion or the like.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1A is a perspective view of one example of an agricultural sprayer.

FIG. 1B is a schematic view of one example of an agricultural sprayer including a localized product injection system.

FIG. 1C is a schematic view of one example of an injection control module of a localized product injection system.

FIG. 1D is a schematic view of one example of a modulating nozzle assembly.

FIG. 1E is a table of example parameter changes for modulating nozzle assemblies including one or more spray modulating elements.

FIG. 2A illustrates a system for detection and tracking of spray droplets, in one example of the present subject matter.

FIG. 2B illustrates a method for determination of droplet characteristics for sprayed application of agricultural products, in one example of the present subject matter.

FIG. 3A illustrates a system for droplet data collection including agricultural sprayer nozzles, in one example of the present subject matter.

FIGS. 3B-3C illustrate test images containing multiple droplets sprayed from an agricultural nozzle of FIG. 3A, in one example of the present subject matter.

FIGS. 3D-3E illustrate extracted droplets from the image of FIGS. 3B-3C using computer vision techniques, in one example of the present subject matter.

FIG. 4 illustrates results of a selective search applied to a test image, in one example of the present subject matter.

FIG. 5 illustrates a visual representation of Faster-RCNN (region-based convolutional neural network) for droplet detection, in one example of the present subject matter.

FIG. 6 illustrates resulting feature maps obtained from applying a residual network (ResNet) to an input image, in one example of the present subject matter.

FIG. 7 illustrates anchor boxes in a feature map on an input image, in one example of the present subject matter.

FIG. 8 illustrates a graph of width v. height for training data, in one example of the present subject matter.

FIG. 9 illustrates a graph of aspect ratios rations of bounding boxes for training data, in one example of the present subject matter.

FIG. 10 illustrates a graph of total loss value for iterations, in one example of the present subject matter.

FIGS. 11A-11B illustrate ground truth of a sample image, in one example of the present subject matter.

FIG. 12 illustrates an image of droplets in a frame, in one example of the present subject matter.

FIG. 13 illustrates droplets extracted from an image and converted to grayscale, in one example of the present subject matter.

FIG. 14 illustrates ellipses fitted to droplets in an image, in one example of the present subject matter.

FIG. 15 illustrates results obtained with and without a Kalman filter prediction block, in one example of the present subject matter.

FIG. 16 illustrates an instance of object tracking represented through a sequence of frames, in one example of the present subject matter.

FIG. 17 illustrates a block diagram of an example machine upon which any one or more of the techniques (e.g., methodologies) discussed herein can perform.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

FIG. 1A shows one example of a sprayer 100. As shown, sprayer 100 is a vehicle based sprayer including an agricultural product dispensing system carried by the vehicle. In another example, the sprayer 100 includes, but is not limited to, a trailer housed sprayer configured for coupling with a vehicle, such as a tractor or the like. As shown in FIG. 1A, the sprayer 100 includes at least two sprayer booms 102. The sprayer booms 102 shown in FIG. 1A are in a stowed configuration, for instance during transport of the sprayer 100 into a field. The sprayer is configured to apply one or more agricultural products including, but not limited to, fertilizers, herbicides, pesticides or the like. The sprayer 100 applies the agricultural product in a liquid form, for instance through one or more nozzle assemblies positioned along the sprayer boom 102 according to the spacing of rows of agricultural crops. As will be described herein, the sprayer 100 applies the agricultural product by mixing an injection product with a carrier fluid to achieve a desired droplet characteristics of the injection product (a fertilizer, herbicide, pesticide or the like) within the carrier fluid. In another example, the injection product includes a plurality of injection products, for instance injected separately by way of differing injection systems or injected as a common mixture of fluids (e.g., from a mixed injection reservoir) into the product dispensers including one or more of the boom sections and nozzle assemblies of the sprayer booms 102.

As will be described herein, an agricultural product is provided in a localized manner to each of the product dispensers whether boom sections or nozzles to provide individualized control of application of the agricultural product. For instance, monitoring of droplet characteristics within spray patterns of one or more nozzles, as described herein, facilitates feedback control of droplets, for instance to achieve specified droplet sizes; directions or speeds (e.g., velocity as well as other kinematics); or the like.

Figure 1B:
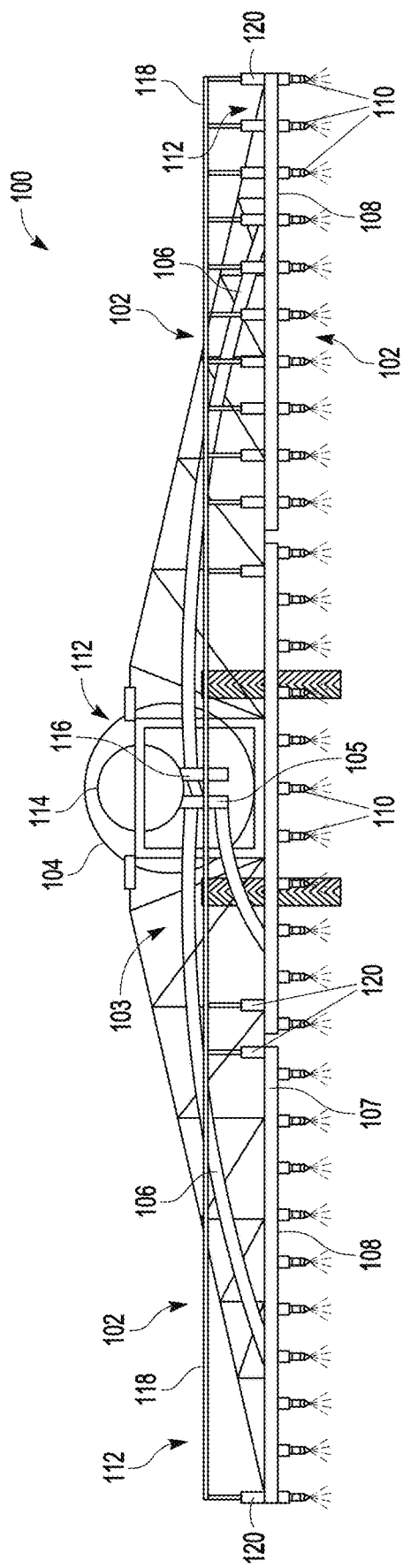

Referring now to FIG. 1B, a schematic representation of the sprayer 100 shown in FIG. 1A is provided. In this example the sprayer booms 102 are in a deployed configuration, for instance extending away from the vehicle 100 shown in FIG. 1A. As shown, the sprayer 100 includes a carrier system 103 including a carrier reservoir 104 positioned centrally within the vehicle or tender. The carrier reservoir 104 includes a carrier fluid therein, for instance water or the like. In another example, the carrier reservoir 104 includes a carrier fluid such as water mixed with an initial carrier product (e.g., a mixed carrier formulation). The carrier fluid in such an example includes, but is not limited to, a primary fertilizer, a primary chemical or water base and fertilizer mixture, spray adjuvant, surfactant or the like.

The carrier fluid is distributed from the carrier reservoir by way of a header 105 coupled with one or more boom tubes 106. The boom tubes 106 extend along the sprayer booms 102 as shown in FIG. 1B and correspondingly transport the carrier fluid the length of the sprayer booms. As further shown in FIG. 1B, the boom tubes 106 are in communication with one or more corresponding boom sections 108. The boom sections 108 are positioned along the sprayer booms 102 and each provide a plurality of nozzle assemblies 110. As will be described herein, the product dispensers 107 include, but are not limited to, one or more of the boom sections 108, the nozzle assemblies 110 or a combination of both. Carrier fluid is accordingly distributed from the carrier reservoir 104 through the header 105 into the boom tubes 106. The carrier fluid is then carried from the boom tubes 106 to one or more boom sections 108 and the associated nozzle assemblies 110 for application of the carrier fluid (mixed with the injection product as described herein) to the agricultural crops.

An example localized product injection system 112 is also shown schematically in two different formats in FIG. 1B. In each of the formats the localized product injection system 112 includes an injection product input, such as an injection product reservoir 114, separate from the carrier reservoir 104. The injection product reservoir 114 includes a volume of the injection product therein (concentrated fertilizer, herbicide, pesticide or the like). The injection product reservoir 114 feeds into an injection header 116, and the injection header 116 is in communication with one or more injection boom tubes 118 extending along the sprayer booms 102.

In one example, shown in FIG. 1B the injection boom tubes 118 are coupled with the product dispensers 107 (the boom sections 108) by one or more injection interfaces 120, which may be a sometime included component of nozzle assemblies 110. The system may include sensors for observing spray 525 and nozzle assemblies 110 having one or more spray modulating elements, and injection is only one option for modulating elements. For instance at the left side of FIG. 1B the injection interfaces 120 are provided at opposed ends of the boom section 108. In another example, the injection interfaces 120 are provided at a single or multiple locations along the boom section 108. The injection product is distributed to the boom section 108 through the injection interfaces 120. As will be described herein in one example the injection interfaces 120 include at least one throttling element, such as a control valve or pump configured to vary the flow of the injection product into the product dispenser 107 (in this case the boom section 108) for mixing with the carrier fluid prior to application. Additionally, in the examples described herein a reference to a control valve or pump is considered broadly to also include other throttling elements. For instance, the recitation of a pump or control valve each include the other (e.g., control valve or pump). Injection of an agricultural product or additive is an option, and some nozzle assemblies 110 may not include injection. In various examples, a control valve, orifice plate, inductor, accumulator, or other modulating element may control droplet characteristics. Thus, injection is an option that some nozzles may use to provide localized concentration control for agricultural products or additives at the nozzle assembly, but is not required for droplet control.

In other examples, the sprayer 100 includes a premixed agricultural product, for instance a carrier fluid having an injection product (or products) mixed therein. The agriculture product (e.g., carrier fluid and injection product) are distributed through the boom tubes 118 to the product dispensers, for instance without downstream injection control. In this example, the each of the nozzle assemblies 110 includes one or more modulating elements configured to control flow rate of the agricultural product. Optionally, the nozzle assemblies 110 are independently controlled or controlled as a group, for instance with the system 501 shown in FIG. 1C.

The second format of the localized product injection system 112 is also shown in the FIG. 1B schematic view. In this example the injection interfaces 120 are coupled with the nozzle assemblies 110 of one or more boom sections 108. Injection interfaces 120 may be an optional component of the nozzle assemblies 110. For instance, as shown at the right portion of the sprayer 100 the injection interfaces 120 are provided at each of the nozzle assemblies 110, in some examples. For instance, the injection interfaces 120 may optionally provide individualized injection of the injection product to one or more of the nozzle assemblies 110.

As further shown in FIG. 1B, the localized product injection system 112 provides a pressurized environment for the injection product at the injection interfaces 120 (whether the injection interfaces are at the boom section 108 or nozzle assemblies 110). The system (carrier and separate injection system and alternatively a carrier and injection product premix system) maintains a pressurized environment of agricultural product fluid to the product dispensers, the nozzles, so the flow control valve, orifice plates, air introduction (e.g., through needle valves) or the like can readily adjust droplet characteristics. Injection interfaces 120 are an optional component of the nozzle assemblies 110.

Figure 1C:
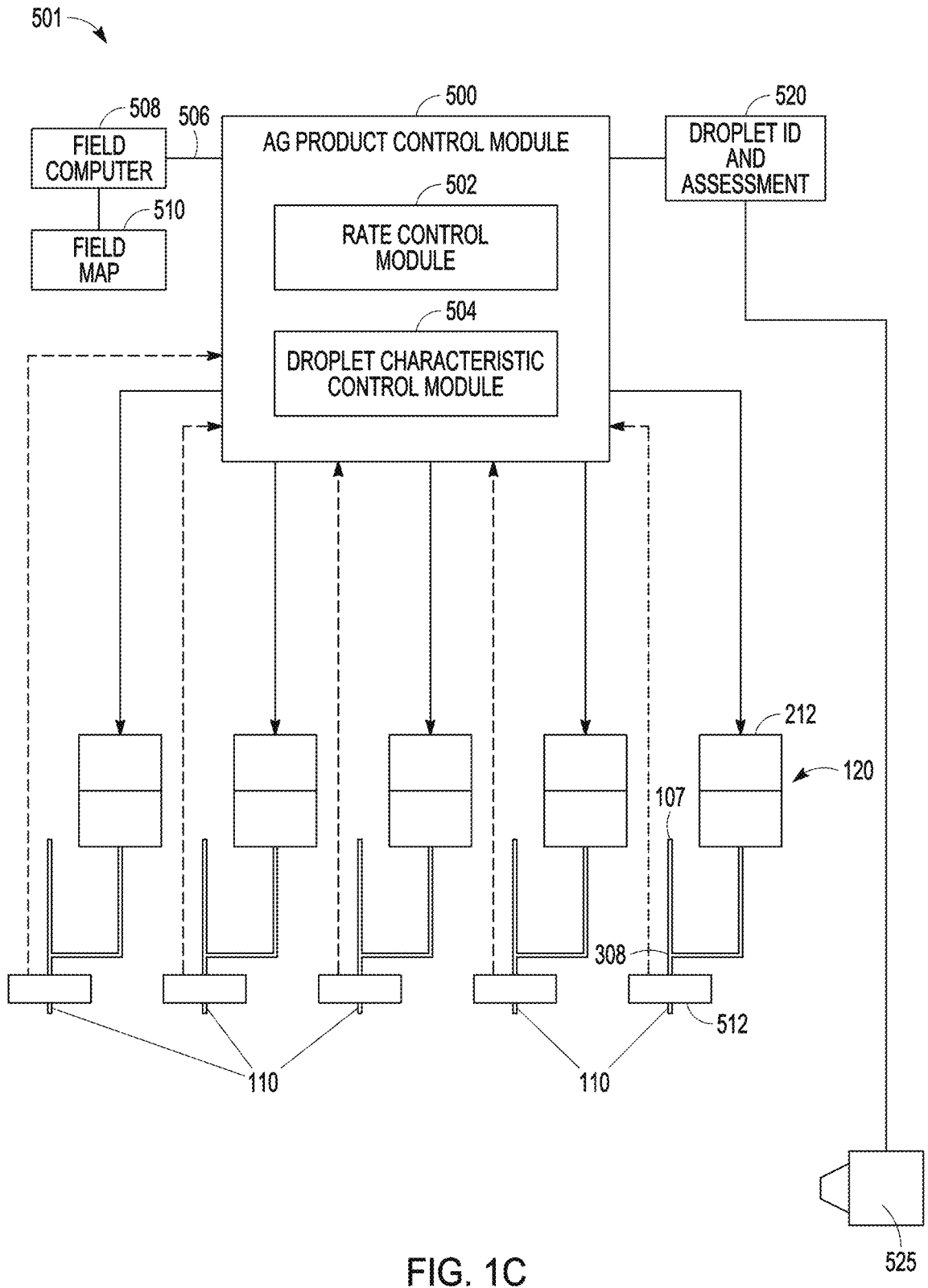
Figure 1D:
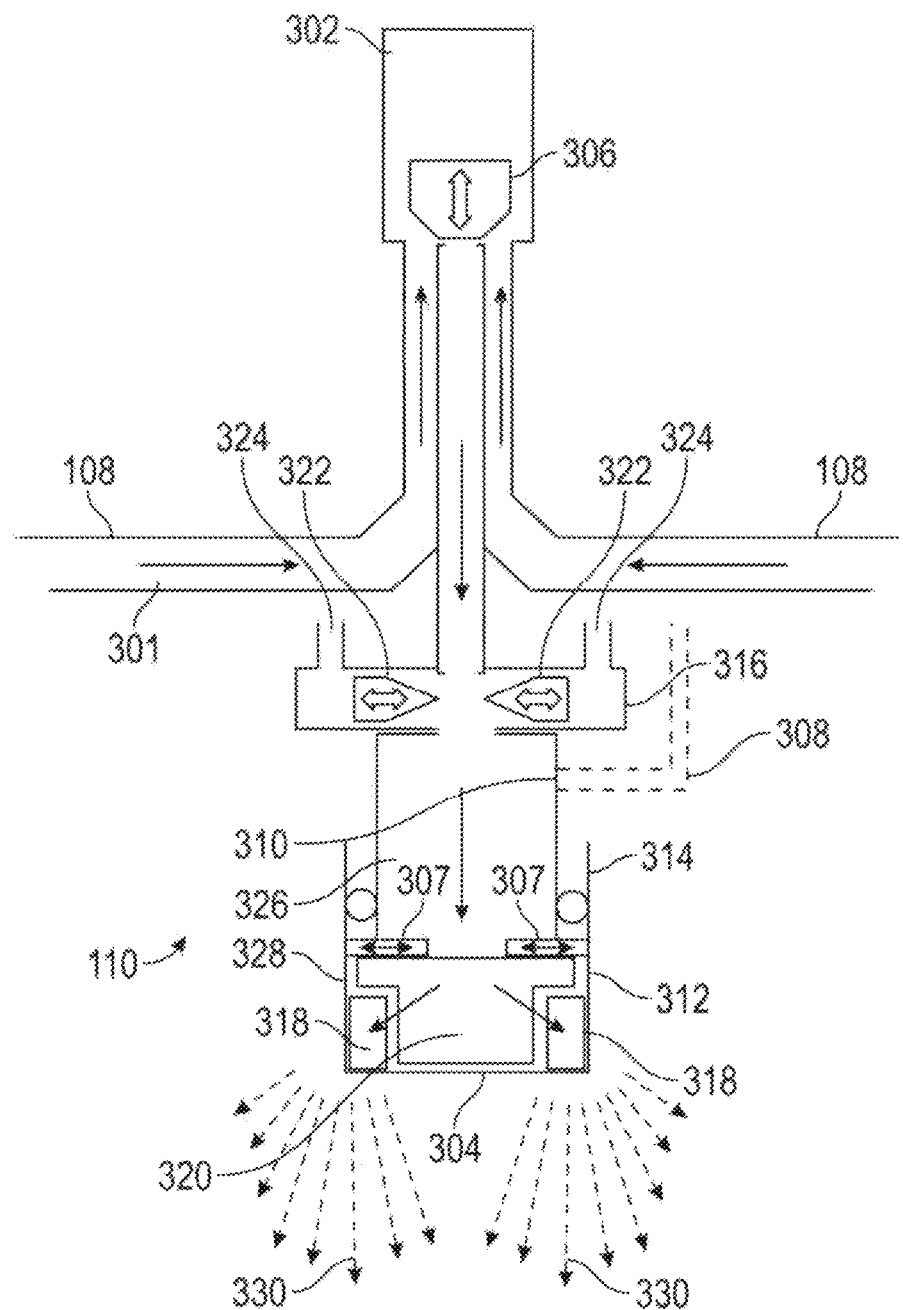

The nozzle assemblies 110 include one or more modulating control elements that control flow rate, pressure (e.g., pressure drop), droplet size, spray pattern or the like. Droplet characteristics, such as droplet size, spray pattern or the like are controlled with spray modulating actuators (also referred to as modulating control elements) of nozzle assemblies 110. For instance, control of agricultural product flow rate and droplet characteristics are optionally conducted with a control valve (e.g., a PWM valve) as a pre-orifice, modulating nozzle assembly or the like. These features adjust flow rate and pressure of the fluid at the nozzle and thereby also control droplet characteristics. In other examples, one or more other modulating control elements are included with nozzle assemblies 110. Some examples are shown in FIG. 1D. As discussed herein, the introduction (or not) of air to the fluid prior to spraying, the controlled operation of the orifice of the nozzle, for instance, with actuatable orifice plates, and control of an accumulator are various options for controlling droplet characteristics in addition to flow rate, pressure or the like. By controlling these features, such as the orifice plates and/or other components of spraying the present system controls the spray pattern (width), droplet size, and velocity (e.g., increase/decrease pressure to increase/decrease speed, change in orifice profile to control direction). In various examples, upstream control may be used to regulate pressure or flow rate of the fluid as it is pumped from the carrier reservoir.

Specified droplet characteristics of the injection product are achieved at the product dispensers 107 according to an individualized droplet characteristics determination (e.g., with an automated controller discussed herein) for one or more (optionally, each) of the nozzle assemblies 110 with injection interfaces 120 being optional component of the nozzle assemblies 110. As discussed herein, the sprayer 100 shown in FIG. 1B assesses droplet characteristics and controls droplet characteristics of the sprayed agricultural product the product dispensers 107, for instance the nozzle assemblies 110.

As discussed herein, in one example a droplet characteristic assessment system (see FIG. 2A), also referred to as a system for detection and tracking of spray droplets, is provided with product dispensers to conduct one or more of identifying spray droplets, tracking droplets, and determining one or more droplet characteristics of the sprayed droplets. FIG. 2A illustrates a system for detection and tracking of spray droplets, in one example of the present subject matter. The system 200 includes a sensor 202 configured to observe droplets sprayed from the nozzle or nozzle assembly, and a frame extractor module 204 configured to obtain data from the sensor. A droplet shape and size extraction module 206 is configured to extract information from the data obtained by the frame extractor module. A droplet tracking module 208 is configured to track individual droplets using the information extracted by the droplet shape and size extraction module. The system further includes a data log module 210 configured to store a list of droplets and information associated with the droplets. In various embodiments, the system is used in a closed loop control system to control actuation of modulating elements in FIG. 1D used to control droplet characteristics, such as nozzle assembly control valves 306, air inductors 316, modulating accumulators 314, orifice plates 307, modulating nozzle assemblies 304 (see FIG. 1D), the interface valves 212 of the injection interfaces 120 associated with the one or more corresponding product dispensers 107 (see FIG. 1C, where injection is included) or the like. Thus, the droplet characteristics of droplets distributed by a sprayer are determined by the present subject matter and the information is used to enhance sprayer performance including, but not limited to, improved coverage of crops targeted by the sprayer. Injection interfaces 120 are an optional component of the nozzle assemblies 110.

FIG. 1C shows one example of a control system 501 for the sprayer 100 that also controls droplet characteristics based on detecting and tracking of droplets. In the example shown in FIG. 1C, the control system 501 optionally controls a plurality of control interfaces or injection interfaces 120 configured to control one or more characteristics of the associated product dispensers, such as agricultural product flow rate and droplet characteristics of the agricultural product sprayed from the nozzle assemblies 110 previously described herein. The nozzle assemblies 110 may include one or more control interfaces or modulating elements that control droplet characteristics, and optionally may include one or more injection interfaces 120 that control flow rate of the agricultural product or additive into the carrier fluid to provide variation in droplet profile. Injection of an agricultural product or additive is an option, and some nozzle assemblies 110 may not include injection. The control system 501 includes a controller, such as the agricultural product control module 500, that controls one or more product dispensers (e.g., nozzle assemblies 110) as a group or independently. For instance, the control module 500 controls one or a plurality of modulating control elements (sometimes referred to as spray modulating actuators) associated with each of the nozzle assemblies 110 to control flow rate, pressure (pressure drop), droplet characteristics or the like. In another example, the control system 501 includes a series of distributed control modules, such as electronic control units (ECUs), for instance associated with discrete or grouped product dispensers to control one or more of flow rate, pressure and droplet characteristics or the like of the associated one or more product dispensers, such as the nozzle assemblies 110.

Referring again to FIG. 1C, the control system 501 includes an agricultural product (or "ag product") control module 500. The agricultural product module 500 may be in communication with each of the modulating control elements of the nozzle assemblies 110 with wired or wireless connections, in some examples. Optionally, where injection control of agricultural products is included with nozzle assemblies, the module 500 is in communication with the injection interfaces 120 (being an optional component of the nozzle assemblies 110), for instance by one or more of wired or wireless connections. The agricultural product module 500 includes, in one example, a rate control module 502 configured to determine and generate signals for one or more of the modulating control elements to control operation of those elements and corresponding characteristics of the agricultural product sprayed from the nozzle assemblies (e.g., flow rate, pressure, droplet characteristics or the like). In various examples, the agricultural product control module 500 includes flow rate control for the application of agricultural product, and as described herein controls droplet characteristics (e.g., droplet size, kinematics, spray pattern or the like).

Figure 1E:
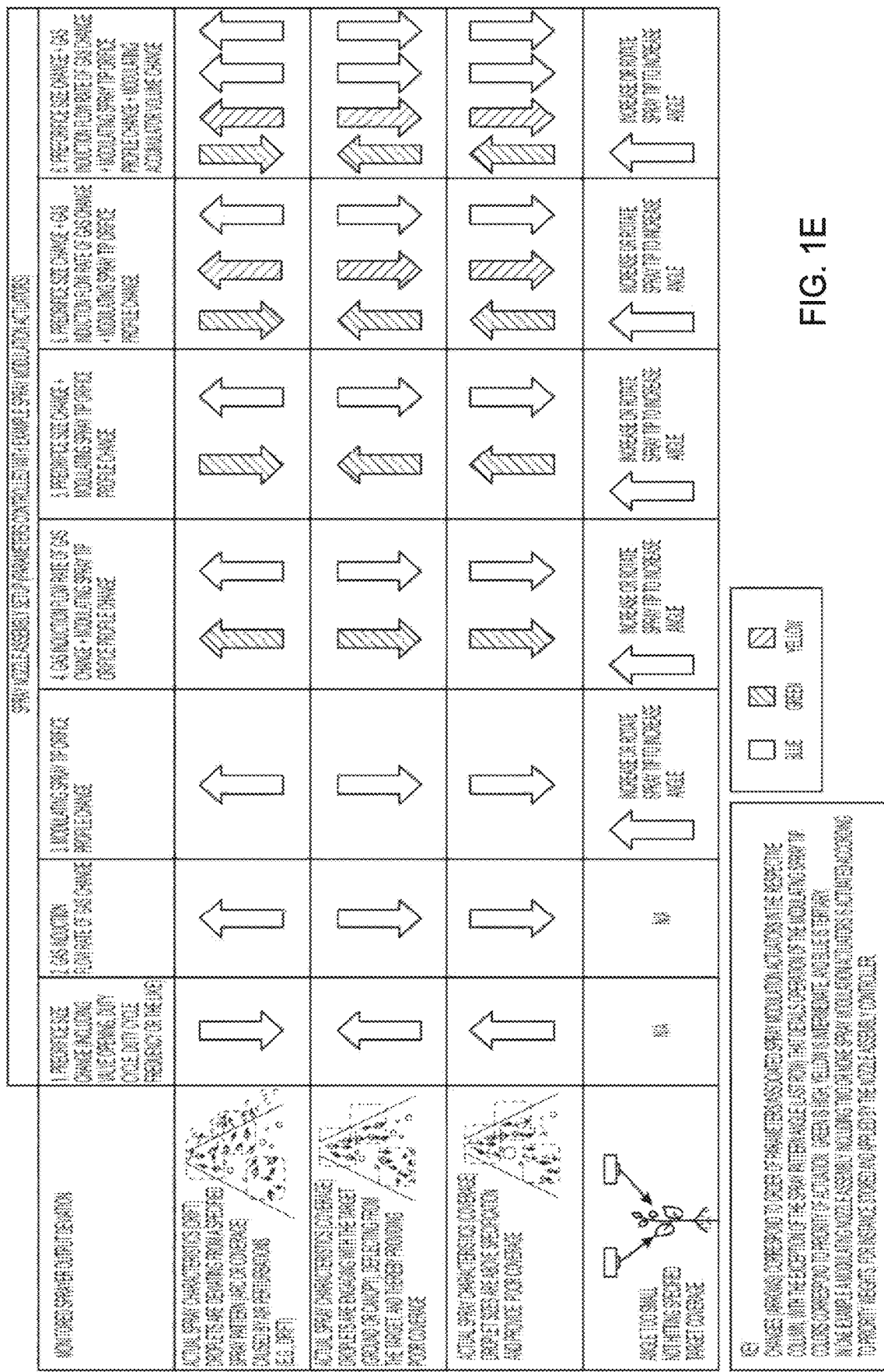
Figure 2A:
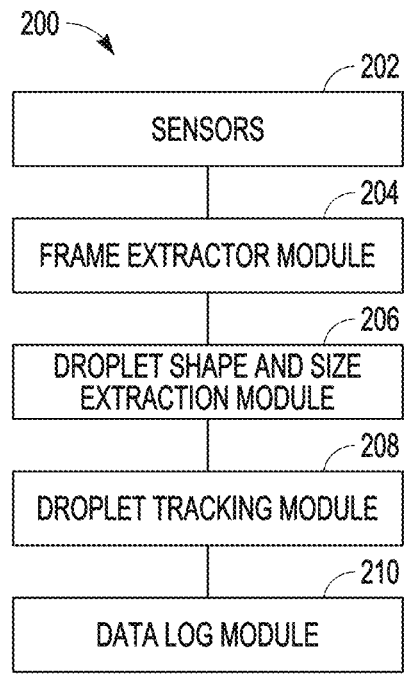

In various examples, the agricultural product control module 500 receives an input from a droplet identification (ID) and assessment module 520, and the agricultural product control module uses the input from the droplet identification and assessment module 520 in a closed loop system to control droplet characteristics in a feedback system. In one example, the droplet identification and assessment module 520 includes at least a portion of the system for detection and tracking of spray droplets of FIG. 2A. In various examples, the droplet identification and assessment module 520 provides a control signal based on an output of at least a portion of the system for detection and tracking of spray droplets of FIG. 2A. In some examples, the output of the droplet identification and assessment module 520 indicates a deviation in droplet characteristics (e.g., measured or determined as discussed herein) such as deviations in droplet size, droplet kinematics, spray pattern or the like from corresponding target or threshold values, and the agricultural product control module 500 adjusts one or more of the nozzle assemblies (as shown in FIG. 1D) or otherwise adjusts output (as shown in FIG. 1E) to compensate for (minimize or overcome) the deviation in droplet characteristics.

In some examples, the agricultural product control module 500 conducts control of one or more of the modulating elements of the nozzle assembly 110 (or assemblies 110) to address deviations in droplet characteristics. For instance, one or more of the modulating elements in FIG. 1D are regulated (e.g., increased, decreased, maintained or the like) to decrease the deviation between the identified droplet characteristics and specified droplet characteristics (e.g., target values, thresholds or the like). Examples of droplet characteristic deviations are shown in FIG. 1E along with example permutations of control for various modulating elements to address the deviations, for instance to decrease the deviations and have sprayer pattern performance that approaches a specified droplet characteristic (or characteristics). In one example, the agricultural product control module 500 includes a droplet characteristic control module 504 to implement the control of the modulating elements to compensate for deviations in droplet characteristics.

In another example, the droplet characteristic control module 504 uses the input from the droplet identification and assessment module 520 to designate one or more of the injection interfaces 120 (an optional component of nozzle assemblies 110) for adjustment of the injection flow rate of injection product (e.g., on, off, and graduated flow rates of the injection product). The droplet characteristic control module 504 selects one or more of the injection interfaces 120 for individualized control of the injection interfaces 120 to achieve a desired droplet characteristics (e.g., change in droplet characteristics) of the injection product in the carrier fluid. The rate control module 502 determines the corresponding rate for each of these selected injection interfaces 120, for instance in cooperation with the field computer interface 506 and a field computer 508 as described herein. Injection of an agricultural product or additive is an option, and some nozzle assemblies 110 may not include injection.

As further shown in FIG. 1C, the injection interfaces 120 (an optional component of nozzle assemblies 110) each include an interface valve 212 in communication with the agricultural product control module 500 as previously described herein. The interface valve 212 accordingly allows for a controlled graduated flow of the injection product through the injection port 308 and into the corresponding product dispenser 107. As shown in FIG. 1C, the injection port 308 or the injection port 216 is used with the injection interface 120, for the product dispenser 107 including the boom section 108.

As further shown in FIG. 1C, a sensor 512 is downstream from the injection port 308. In other examples, the sensor 512 includes a concentration sensor configured to detect the concentration of the injection product within the agricultural product based on a comparison of at least one characteristic of the agricultural product at a product dispenser 107 relative to the same at least one characteristic at another product dispenser 107. In various examples, one or more spray sensors 525 (e.g., cameras or the like) observe or record droplet characteristics. The spray sensors 525 are connected to the droplet ID and assessment module 520 or are connected to the agricultural product control module 500 to permit identification and assessment of droplet observations. Other types of sensors can be used without departing from the scope of the present subject matter.

As shown in FIG. 1C the sensors 512 are in communication with the agricultural product control module 500. In one example, the sensors 512 cooperate with the droplet identification and assessment module 520 and the agricultural product control module 500 to provide for feedback control of the modulating elements of the nozzle assemblies. Stated another way, the sensors 512 and/or the droplet identification and assessment module 520 measure the droplet characteristics in an ongoing manner and accordingly allow for adjustments of the modulating element of the nozzle assemblies by the agricultural product control module 500 to accordingly ensure the nozzle assemblies generate sprayed agricultural product having specified droplet characteristics. With the agricultural product control module 500, the droplet ID and assessment module 520 described herein, and the nozzle assemblies 110 having one or more modulating elements to control droplet characteristics, the system 501 addresses deviations from specified droplet characteristics, and thereby approaches application of the agricultural product with droplet characteristics that conform to the specifications (e.g., the specified droplet characteristics).

In another example, the agricultural product control module 500 includes a field computer interface 506. As shown, the field computer interface 506 provides an interface for coupling with a field computer 508 (part of the sprayer 100, with a leading vehicle such as a tractor, or a standalone device) and the field computer 508 includes a field map 510. As will be described herein the field map 510 includes a series of prescriptions of agricultural products including specified droplet characteristics, seed types, irrigation or the like for various zones. The differing prescriptions for each of the zones are determined through analysis of the field terrain, yields from previous crops, environmental conditions or the like. In some examples, specified droplet characteristics may be provided by field map prescriptions.

The field map 510 provides a plurality of prescriptions for an agricultural product or agricultural products throughout the field (e.g., in one or more of the zones of the field). As the field computer 508 communicates with the agricultural product control module 500 which uses the field map 510 and its associated zone based prescriptions to independently specify the flow rate of an agricultural product, optionally an injection product for each of the injection interfaces 120 (being an optional component of nozzle assemblies 110), and further specifies droplet characteristics for spray patterns emanating from the nozzle assemblies 110.

Further, with GPS systems, mathematical representations of the product dispensers 107 (e.g., the boom sections 108 or nozzle assemblies 110) along the sprayer booms 102, or the like the location of each of the product dispensers 107 of the sprayer 100 is continuously determined on the field map. As one or more product dispensers 107 of the sprayer 100 are within a zone or are poised to enter a zone the agricultural product control module 500 selects the corresponding nozzle assemblies 110 for adjustment of agricultural product flow rate (optionally injection product) and associated droplet characteristics based on the field map prescription for the zone.

The sprayer 100 described herein is able to instantaneously deliver an accurate droplet characteristics of the injection product to the carrier system at one or more of the injection interfaces 120 (being a sometime included component of nozzle assemblies 110) by way of individualized control of each of those injection interfaces 120, including a modulating nozzle assembly. In some examples, the present modulating elements provide for near instantaneous control of the sprayed agricultural product including one or more of flow rate, droplet characteristics or the like, using the system described herein and the associated modulating element(s) provided with corresponding nozzle assemblies 110.

FIG. 1D is a schematic view of one example of a modulating nozzle assembly 110. The nozzle assembly 110 includes a spray tip 304, a control valve 302, and one or more spray modulating elements. An agricultural product 301 (one or more of carrier fluid, injection product or mixed carrier fluid with injection product) is provided along the boom tube 108 to each of the modulating nozzle assemblies 110. As shown in FIG. 1D, the agricultural product is provided to the assembly 110 through the control valve 302. For instance, the valve operator 306 is selective opened and closed (e.g., according to a duty cycle, operating frequency or the like) to provide a specified flow rate of the agricultural product to the spray tip 304 for application to a target such as a crop, ground, pest, weed or the like. In another example, the modulating nozzle assembly 110 includes a supplemental nozzle assembly in communication with the carrier fluid, agricultural product or separate reservoirs of carrier fluid and injection product. The supplemental nozzle assembly is an optional second nozzle that provides a supplemental spray pattern of the agricultural product or, optionally, a different agricultural product than that provided from the spray tip 304. In other examples, the supplemental nozzle assembly provides a base flow rate of the agricultural product and the modulating nozzle assembly 110 (including the spray modulating elements) provides a controlled (e.g., varied droplet size, spray pattern or the like) application of the agricultural product.

In another example, the modulating nozzle assembly 110 includes an injection assembly configured to administer one or more injection products (e.g., additives) to a carrier fluid provided through the boom tube 108. The injection assembly includes an injection line 308 in communication with the modulating nozzle assembly 110 at an injection port 310. An injection control valve controls the flow of the injection product to corresponding control the concentration of the injection product in the carrier fluid, the resulting composition and concentration of the agricultural product or the like. As shown in FIG. 1D, the injection is proximate to the assembly 110 and the spray tip 304, and accordingly localizes mixing of the agricultural product in a manner to ensure rapid application of a specified composition and concentration of the injection product to the target.

In this example the modulating nozzle assembly 110 includes one or more modulating elements configured to control one or more of flow rate, droplet size, spray pattern or the like (e.g., the actual spray profile). The nozzle assembly 110 may include a plurality of these elements such as, but not limited to, the orifice (e.g., the modulating spray tip 312), modulating accumulator 314, gas inductor 316, or the control valve 302. Optionally, where two or more spray modulating elements are included with the modulating nozzle assembly 110 these actuators cooperate with each other to control droplet size or alternatively control a different droplet characteristic (e.g., spray pattern, droplet kinematics or the like). For instance, the control valve 302 is operated to control droplet size while the modulating spray tip 312 is operated to control the spray pattern.

A nozzle assembly controller (such as agricultural product control module 500) provides one or more control instructions to the corresponding spray modulating elements (e.g., motors, stepper motors or the like that control the movable features of the spray modulating elements that affect nozzle performance including droplet size, pattern or the like). As discussed herein, spray modulating elements include features associated with the nozzle assemblies that provide control of one or more characteristics of the actual spray profile (e.g., droplet size droplet kinematics, spray pattern or the like). Modulation, as used herein, includes, but is not limited to, controlled movement, position, operation or the like of features associated with the spray modulating elements to control characteristics of the actual spray profile including changing characteristics, maintaining characteristics (e.g., while other characteristics, like pressure or flow rate, change) or the like. In one example, modulation or modulated control includes, but is not limited to, graduated control of nozzle fittings, orifice plates, gas inductors, accumulators or the like between open and closed positions as well as intermediate positions to control aspects of actual spray profiles from the nozzle assemblies. In another example, modulation may include the reciprocating operation of a pre-orifice type actuator such as a flow rate control valve using pulse width modulation control (e.g., duty cycle, duty cycle frequency or the like).

Referring again to the control valve 302 of the modulating nozzle assembly 110, the valve operator 306 includes one or more of a solenoid operated poppet, butterfly valve, needle valve or the like. In some examples the control valve provides flow rate control and is also an example of a spray modulation actuator. For instance, the control valve 302 is operated as a pre-orifice to the nozzle assembly 110 and the spray tip 304 to control pressure (e.g., control droplet size) through variation in the valve opening, duty cycle, duty cycle frequency (number of open and close instances per unit time) or the like. For example, increasing one or more of the opening of the control valve 302, duty cycle (percent open), duty cycle frequency or the like minimizes pressure drop across the valve 302, and thereby decreases the droplet size from the spray tip and the spray pattern droplets are finer. Conversely, decreasing one or more of opening of the control valve 302, the duty cycle, duty cycle frequency or the like increases pressure drop across the valve 302 and thereby increases the droplet size from the spray tip making the spray pattern droplets coarser.

Another example of a pre-orifice actuated as a spray modulation actuator includes one or more orifice plates 307 shown in FIG. 1D. The orifice plates 307 are selectively opened, closed (e.g., fully closed to shut off spray), including intermediate positions therebetween to control pressure (pressure drop) and corresponding droplet size. For instance, the modulating nozzle assembly 110 includes at least one orifice plate 307 coupled with an actuator, and the actuator moves the at least one orifice plate 307 into or out of the flow of the agricultural product by controlling the orifice upstream of the spray tip 304, for instance according to control instructions from the spray modulation interface of the nozzle assembly controller. In a similar manner to the control valve 302 operated as the pre-orifice, operation of the one or more orifice plates 307 to close the upstream orifice causes an increased pressure drop across the one or more orifice plates 307 and increases droplet size emanating from the spray tip 304. Conversely, opening of the orifice through opening movement of the one or more orifice plates 307 decreases the pressure drop across the plates 307 and decreases droplet size emanated.

Other examples modulating spray actuators include, but are not limited to, a modulating spray tip 312, a modulating accumulator 314, gas inductor 316 in addition to or alternative to the control valve 302. As shown in FIG. 1D the modulating nozzle assembly 110 in this example includes the modulating spray tip 312 as the spray tip 304. The modulating spray tip 312 includes one or more spray ports 318 and a nozzle fitting 320 having one or more fitting ports. The spray ports 318 and the fitting ports of the nozzle fitting 320 are actuated in combination (e.g., translated or rotated relative to each other) to selectively align and misalign to vary a composite spray orifice including the respective spray port 318 and fitting port of the nozzle fitting 320. Misalignment of the ports contracts the composite spray orifice and accordingly provides a finer spray having corresponding smaller droplet sizes. Conversely, alignment of the ports enlarges the composite spray orifice and provides a coarse spray having corresponding larger droplet sizes. Examples of droplet sizes include one or both of quantitative sizes (e.g., specified dimensions, dimension ranges) or qualitative sizes including ultrafine, fine, medium, coarse, ultracoarse or the like. In other examples, the relative movement of the nozzle fitting and its fitting ports relative to the one or more spray ports 318 changes the spray pattern, such as the arc of the spray pattern coverage, in combination with or independently from control of droplet size.

The gas inductor 316 is another example of a modulating spray actuator of the modulating nozzle assembly 110. In the example shown in FIG. 1D, the gas inductor includes one or more induction valves 322 interposed between a gas source 324 and the remainder of the nozzle assembly 110. The gas inductor 316 is interposed between the spray tip 304 and the control valve 302. The gas source 324 includes ambient atmosphere, a reservoir of gas (e.g., Nitrogen, compressed air or the like).

The induction valves 322 include valves configured to control a flow rate of gas to the agricultural product prior to application. In an example, the induction valves 322 include needle valves and associated actuators that move the valve needles between seated and unseated configurations to meter the introduction of gas to the agricultural product.

In operation, the induction valves 322 are controlled to increase, decrease or maintain a flow rate of gas to the agricultural product. An increased flow rate of gas to the agricultural product increases droplet size in the sprayed agricultural product (e.g., the droplets are coarser). Conversely, a decreased flow rate of gas to the agricultural product decreases droplet size and provides a finer sprayed agricultural product. Optionally a gas quality sensor, humidity sensor or composition sensor is included with the gas inductor to assess the input gas (e.g., atmosphere) prior to or during induction.

The modulating nozzle assembly 110 shown in FIG. 1D includes a modulating accumulator 314 as another example spray modulating actuator. As shown, the modulating accumulator includes an assembly chamber 326 interposed between the control valve 302 and the spray tip 304 to facilitate mixing of gas with the agricultural product (e.g., with an expanded volume of the accumulator) to increase droplet size (make coarser). Alternatively, the assembly chamber 326 is contracted with the accumulator 314 to decrease droplet size (e.g., make fine droplets with a contracted volume).

In the example shown in FIG. 1D, the modulating accumulator 314 includes a telescoping accumulator body 328 operated with an associated accumulator actuator (e.g., motor) to vary the volume of the accumulator/assembly chamber.

As further shown in FIG. 1D, the modulating nozzle assembly 110 provides one or more spray patterns 330 emanating from the spray tip 304 (optionally the modulating spray tip 312). The spray pattern 330 includes a characteristic such as an arc, shape or the like, for instance corresponding to the arc of the spray from each spray port 318, the combined arc between spray ports 318 of the assembly 110 or the like. Additionally, the spray pattern 330 includes droplets therein having a droplet size corresponding to a qualitative dimension (fine, coarse or the like) or a quantitative dimension (e.g., microns, millimeters or the like). The spray pattern 330 and the associated droplets therein are examples of an actual spray profile generated from the modulating nozzle assembly 110. As described herein, the actual spray profile (with detectable droplet characteristics) is controlled with the spray modulating actuators to achieve one or more specified spray profiles having one or more specified droplet characteristics including, but not limited to, droplet size, droplet kinematics, spray pattern or the like. As discussed herein, control of the actual spray profile having controlled droplet characteristics is, for instance, based on observations of the actual spray profile and determination of deviation of the actual spray profile relative to a specified spray profile (e.g., having specified droplet characteristics).

FIG. 1E is a table of example parameter changes for modulating nozzle assemblies 110 including one or more spray modulating elements. The spray modulating elements are described herein, and are configured to control one or more characteristics of an actual spray profile including, but not limited to, droplet size, spray pattern, associated droplet kinematics or the like. FIG. 1E provides a non-limiting list of the spray modulating elements, combinations of actuators and a variety of spray profile deviations. FIG. 1E further provides examples, of control instructions implemented with each of the spray modulating elements and combinations of the same for the various determined spray profile deviations. The determined spray profile deviations are observed and identified as discussed herein by systems configured to observe actual spray patterns, identify droplets, and determine characteristics of the droplets (e.g., size, kinematics or the like). The spray modulating elements are provided along the upper portion of the table (e.g., permutations 1 to 6 and 6'). The determined spray profile deviations are provided along the left portion of the table.

The example nozzle assembly controller (such as agricultural product control module 500) includes one or more algorithms, feedback controllers, operator or manufacturer specified parameter changes or the like that are implemented based on a combination of monitored sprayer profile deviations and the available sprayer modulating elements for the respective modulating nozzle assembly 110. Examples of parameter changes made based on sprayer profile deviations and example nozzle assembly setups are shown in FIG. 1E with corresponding arrows indicating one or more of increases, decreases or the like of the parameter (or parameters) associated with the respective spray modulating elements.

In one example, the magnitude of spray modulation actuator changes, priority of modulation changes or the like (e.g., to orifice size, gas induction flow rate, pre-orifice size, accumulator volume or the like) are made according to one or more of operator or manufacturer preferences, algorithm based outputs, magnitude of deviation from the specified spray profile, type of deviation (or deviations) determined as part of the spray profile deviation or the like. In other examples, magnitude, priority or the like of the actuator control instructions are determined according to apportionment (e.g., weighting) between available spray modulating elements of respective modulating nozzle assemblies. For example, as shown in various permutations of spray profile deviations with modulating nozzle assemblies 110 having two or more spray modulating elements (e.g., columns for 4 to 6 and 6') a priority of control is provided with green (first hatching) having a higher priority relative to yellow (second hatching), and yellow having a higher priority to blue (no hatching in the arrow). For example, with the modulating nozzle assembly 110 shown in column 4, having the gas inductor 316 and the modulating spray tip 312 priority is optionally set in this permutation with the gas inductor 316 control priority greater than the modulating spray tip 312 control. Accordingly, one or both of priority of modulation, magnitude of modulation or initial and secondary modulation is prioritized for the gas inductor 316 first and the modulating spray tip 312 second.

In another example, in column 6' having a modulating nozzle assembly 110 with pre-orifice control (e.g., the control valve 302 or pump are actuated to control droplet and spray characteristics), the gas inductor 316, modulating spray tip 312 and the modulating accumulator 314 the nozzle assembly controller of the sprayer nozzle assembly control system 120 prioritizes the actuators. Injection interfaces 120 are an optional component of the nozzle assemblies 110. For instance, the pre-orifice control is prioritized higher than the gas inductor 316, the gas inductor 316 is prioritized higher than each of the modulating spray tip 312 and the modulating accumulator 314, and the spray tip and accumulator have equal, matched or identical priorities. Accordingly, one or both of priority of modulation, magnitude of modulation or initial, secondary and tertiary (or greater) modulation is prioritized for the pre-orifice, the gas inductor 316, and the accumulator 314 and spray tip 312 in that order.

Accordingly, with the field map 510 having various prescriptions (specified flow rates, specified spray profiles including droplet characteristics, or the like) and may include a plurality of product dispensers 107 with individually controlled injection interfaces 120. Injection interfaces 120 are an optional component of the nozzle assemblies 110. The system 501 includes sensors for observing spray 525 and nozzle assemblies 110 having one or more spray modulating elements.

The droplet characteristics of sprayed droplets provided by nozzle assemblies of an agricultural sprayer are determined by the present subject matter and the information is used to enhance sprayer performance including, but not limited to, improved coverage of crops targeted by the sprayer. An artificial intelligence (AI)-enabled framework may optionally be provided that is capable of processing images obtained of droplets, detecting and tracking all droplets appearing across image frames, and measuring the droplets' geometric and dynamic data, such as droplet size and velocities. The determined droplet characteristics are optionally used to control sprayer nozzles to provide for improved application of sprayed fluids to the targeted agricultural product including but not limited to, adherence of the fluid, breadth of coverage, increased droplet size to mitigate the effect of wind based spray dispersion or the like.

In various embodiments, the present system uses one or more sensors, such as a camera, infrared sensor or the like (collectively referred to as sensors or cameras), to obtain images of sprayed agricultural product including images of droplets from actual sprayed agricultural products in working environments including fields. The images are processed using a series of filters to isolate the droplets, in various embodiments. In examples, the system and method identifies the perimeter of the droplet and the center of gravity of the droplet, and uses the identification information to track droplets in successive image frames, and determine one or more of droplet velocity and direction (e.g., examples of droplet kinematics). In some embodiments, the system uses multiple size categories from fine to coarse to distinguish droplets.

According to various embodiments, the present system optionally applies artificial intelligence to provide for detection and tracking of droplets between image frames. The system applies a procedure to flip an image or change an angle of an image to augment a droplet dataset, in an embodiment. The algorithm is validated using a separate droplet dataset, in various examples, and the validated algorithm is tested using successive image frames to detect droplets using a testing data set to produce a desired accuracy level. The present system may detect droplets in successive frames at an accuracy level of approximately 90 percent (in other examples, accuracy levels are 60, 70, 80 percent or more). Various examples of the present system use a Kalman filter to track droplets among image frames. In some embodiments, the present system includes multiple stages of operation, including but not limited to prediction of droplet position, updating of the prediction of droplet position data, filtering of the data using an optimal or suboptimal filter, and tracking of droplet position between successive image frames using the filtered data. The present system applies a frame label to droplets of interest in a current image frame to assist in droplet detection and tracking using AI, in various embodiments. Using the frame label or identification (ID), the present system can distinguish droplets that appear identical or nearly identical in multiple image frames, in some examples.

After each stage in the droplet identification and tracking process, the present system refines data used and stored in one or more memories accessible by the system, in some examples. The system can scan the entire image frame or some portions of the image frame, including using regions of interest (RoI) identified by the system in which the probability of droplet location is relatively high compared to other regions of the image frame. The system can limit focus or search for droplets to the RoI, in various embodiments. In some embodiments, the present system applies noise reduction as an image processing function, such as using filters to remove objects that are less likely to be droplets from the image frame. In one embodiment, a Gaussian filter is applied to the image frame using the present system. The system draws a bounding box or border around each droplet of interest detected, in various examples, and inputs the bounding box data including coordinates, perimeter and area of the bounding box to a fully connected neural network to locate and track the droplet of interest. In some examples, the present system fits an ellipse to the detected droplet.

Various examples of the present systems and methods index and track droplets once identified using equations provided to compare a difference in parameter sets that are extracted and stored for each droplet of interest. The difference in parameter sets for droplets is compared to a programmable threshold to determine a match of droplets and track the droplets across image frames, in various examples. This difference in parameter sets may be a unitless value, in some examples. In some embodiments, a linear distance between droplets is calculated and used for droplet identification and tracking. In various embodiments, a cost function is used that combines a parameter set difference and a linear distance using a weighted combination, such as an equally weighted combination, to enhance identification and tracking of droplets among image frames. Other characteristics (or number of characteristics) can be used without departing from the scope of the present subject matter. In some examples, a droplet can split into two droplets in a subsequent image frame, and the present system can identify and track to two droplets using the methods provided for single droplet tracking.

The system can match droplets in image frames by generating a vector of position, geometric properties, and motion of identified droplets, and comparing vectors of identified droplets using a cost function, in various embodiments. The system can build the cost function and match droplets by minimizing a cost or difference between droplet data, in some embodiments. In various examples, each droplet detected has an opportunity to be matched in a programmable number of subsequent image frames, otherwise the droplet is discarded. If a droplet is detected close to a boundary of an image frame, the droplet has potential to be a new droplet, or to be removed, in various examples. Some embodiments of the present system use one or more Kalman filters to predict motion of the droplets. In some examples, if the droplet is not matched in successive frames using a cost function, the system will make a guess or prediction of the location of the droplet in a successive image next frame. If no match of the droplet is obtained using the cost function and the Kalman filters, the system may remove the droplet data from a buffer or memory and stop tracking the droplet. In various examples, the system tracks pixels per distance (e.g., pixels per inch) of droplet displacement between image frames, and uses the known frame rate of the image sensor to compute velocity of a droplet.

In various examples, the present systems utilize a cost function and a predictive function for droplet matching and tracking. In one example, prediction of droplet motion can be combined with or built into the cost function. In various examples, the cost function uses a weighted combination of droplet characteristics to identify droplets of interest, and can include a predictive component for the identification calculation. In some examples, to track or match a droplet in a next image frame, droplet data (or characteristics) of the droplet are compared to all or some of the droplets in the next image frame, and the lowest cost produced by the comparison is deemed to be the matched droplet. A predictive function is applied in various examples to locate and match the droplet. In one example, a programmable threshold for the cost function is provided such that a droplet will not be identified and tracked if the cost function does not produce a result within the threshold. In this example, the system can search for the droplet in a predetermined number of subsequent image frames, and if not matched within the predetermined number of frames, the droplet data with be dropped from the buffer. The system compares an identified droplet from a first frame of video to an array of droplets in a second frame, selects droplet from the array that has the lowest cost function to identify droplet, and once identified, count pixels of displacement and based on the displacement produce a vector (using motion and direction of motion) used to identify and match the droplet.

In various embodiments, the system labels droplets and uses the labels (or unique identifiers) to assist in training the AI component for droplet identification in one or more image frames. The system processes the droplets in a loop using an index or buffer of droplet data including the droplet label, in various examples.

As discussed herein, in one example a droplet characteristic assessment system 200 (see FIG. 2A), also referred to as a system for detection and tracking of spray droplets, is provided with product dispensers to conduct one or more of identifying spray droplets, tracking droplets, and determining one or more droplet characteristics of the sprayed droplets. In various embodiments, the system is used in a closed loop control system (e.g., feedback control) to control actuation of the interface valves 212 of the injection interfaces 120 associated with the one or more corresponding product dispensers 107, as shown in FIG. 1C. The system 501 may include sensors for observing spray 525 and nozzle assemblies 110 having one or more spray modulating elements.

According to various embodiments, the frame extractor module 204 is configured to extract frames from an input video (including successive still camera images) at a fixed frame rate as defined by a user. The droplet shape and size extraction module 206 is configured to extract geometric information about detected droplets in a current frame provided by the frame extractor module, in an example. In some examples, the droplet tracking module 208 is configured to track droplets by matching the droplets between frames based upon information obtained from a new frame which has been processed by the droplet shape and size extraction module 206. The data log module 210 is configured to store a list of droplets and information associated with the droplets, including one or more of: position in a current frame, position in a previous frame, shape and size of each droplet in the current frame, parameters of a dynamic model associated with each droplet, a numerical value that counts a number of times each droplet has been matched continuously with previous frames referred to as success value, a numerical value that counts a number of times each droplet has not been matched with previous frames referred to as loss value, and a unique identifier for each droplet.

In some examples, the droplet shape and size extraction module 206 is configured to output droplet shape information, and the droplet shape and size extraction module 206 includes a frame noise suppression module using a Gaussian filter, an object detection module configured to determine a detected droplets confidence score and corresponding bounding box coordinates by executing a trained deep neural network model, a refinement module configured to select droplets having a confidence value above a user-defined threshold, a least square-based ellipse fitting module configured to provide information associated with a fitted ellipse for the selected droplets, and an extraction module configured to extract information by fitting an ellipse to detected droplets and transmit the information to the droplet tracking module.

In various examples, the droplet shape and size extraction module 206 includes a neural network configured to refine droplet image data. In these examples, the droplet shape and size extraction module 206 includes a feature extraction module including a deep neural network with convolution operations that learns to recognize important features in an image to allow the deep neural network to distinguish droplets, a region proposal network including a second neural network that receives an output from the feature extraction module and identifies and outputs proposed regions in a feature map that contain an object, a region of interest (ROD pooling module configured to make all of the proposed regions a same size, and an inference network including connected layers that take reshaped region proposal regions as an input and output the droplets and their corresponding bounding box, and further outputs a confidence score for each of the detected droplets in the image, wherein the confidence score is a numerical value within a range of 0 and 1 that is configured to filter out detections having confidence scores below a user-defined threshold, which are decarded as not being droplets.

According to various embodiments, accuracy of the trained model is evaluated using images in a set $\Omega$ as defined in an equation:

$$\frac{1}{n(\Omega)} \sum_{x=1}^{n(\Omega)} \frac{T_{Dx}}{T_{Dx} + F_{Dx} + M_{Dx}}$$

In this example, a total number of images in the set $\Omega$ is represented using $n(\Omega)$, $M_{Dx}$ is a total number of droplets missed by the trained model for an image when compared to its ground truth, $F_{Dx}$ is a total number of incorrect detections made by the trained model for the image when compared to its ground truth, $T_{Dx}$ is a true detection which is computed by subtracting a total number of droplets detected by the trained model for the image with the total number of incorrect detections for the image. The ground truth includes manually labeled data used for network training, including a bounding box around each droplet in the image.

In some embodiments, the accuracy of the trained model is configured to be used to guide a training process of the trained model, and wherein the training process of the model is stopped when the accuracy is greater than or equal to 90%. The training process is not limited to real data of droplets, and the training process is configured to use generated images of droplets using generative models during the training of the neural network model used for droplet detection, in various examples. The droplet tracking module 208 can include a multi-step process comprising droplet matching and sharing of outputs with the data log module. The droplet matching can include computing a cost between new droplets and past droplets that are stored in the data log module, applying a Hungarian algorithm to determine a unique match between new droplets and past droplets that are stored in data log module 210, and providing refinement and grouping of droplets that are matched between past droplets and new droplets obtained by applying the Hungarian algorithm.

In various examples, the refinement and grouping of droplets that are matched between past droplets and new droplets includes, for each match between new droplets and past droplets: if the cost is below a user-defined threshold, accept each pair and update information for matched droplets based upon the information from the new droplet, and if the cost is above the user-defined threshold then: for unmatched droplets stored in the data log module 210: update information for unmatched droplets using a Kalman filter for predicting a position of the unmatched droplets in a next frame, and for unmatched droplets detected in a current frame, append each of the unmatched droplets detected in the current frame into the data log if a number of detected droplets in the current frame is greater than the number of droplets in the data log. In some examples, updating information for matched droplets includes copying current location information of a past droplet into past location information of the past droplet, including replacing the current location information of a past droplet with location information of a new droplet, updating shape and size of each droplet of the past droplet with the shape and size information of the new droplet, updating parameters of a dynamic model stored for the past droplet, increasing a first numerical value by one that counts a number of times the past droplet has been matched continuously in previous frames, and updating a second numerical value to zero that counts a number of times the past droplet has not been matched continuously in previous frames.

According to various examples, updating information for unmatched droplets includes the following steps for each droplet pair of a new droplets and a past droplet: copying current location information of the past droplet into past location information of the past droplet, and replace the current location information with a Kalman filter prediction location of each droplet in the next frame, updating shape and size of each droplet of the past droplet with the shape and size information of the new droplet, updating a numerical value to zero that counts a number of times the past droplet has been matched continuously in previous frames, and updating a loss value with an increment of one. Some examples include appending information into the data log module associated with each droplet, including: position in the current frame is stored based upon the information extracted from droplet shape and size extraction module, position in a previous frame is left empty, shape and size of each droplet in the current frame is stored based upon the information extracted from droplet shape and size extraction module, parameters of a dynamic model associated with each droplet use the dynamic model, a first numerical value that counts a number of times each droplet has been matched continuously with previous frames referred to as success value is set to zero, a second numerical value that counts a number of times each droplet has not been matched with previous frames referred to as loss value is set to zero, and a unique identifier for each droplet is added.

In some examples, tracking updates values stored in the data log module 210, including determining whether a droplet current position is outside an image frame, and if so to removing the droplet and its associated characteristics from the data log. The system is configured to repetitively detect and track droplets for image frames extracted by a frame extractor, in some examples.

In various examples, the system further includes a nozzle controller, such as control module 500, configured to control function of the nozzle (or nozzle assembly 110) to implement feedback control of nozzle output based on the information associated with the droplet. At least a portion of the system is incorporated into an agricultural machine, in various embodiments.

Figure 2B:
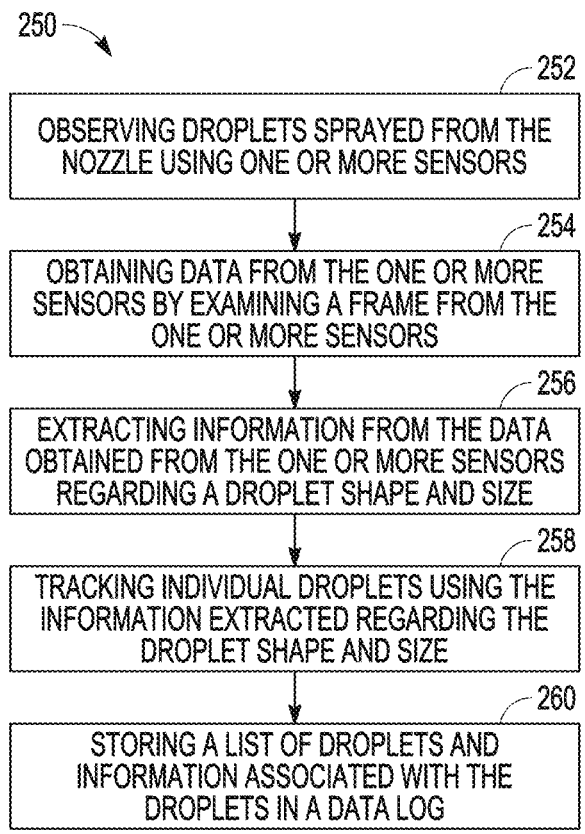

FIG. 2B illustrates a method for determination of droplet characteristics for sprayed application of agricultural products from a nozzle, in one example of the present subject matter. The method 250 includes observing droplets sprayed from the nozzle using one or more sensors at step 252, and obtaining data from the one or more sensors by examining a frame of an image from the one or more sensors at step 254. At step 256, information is extracted from the data obtained from the one or more sensors regarding a droplet shape and size, and individual droplets are tracked using the information extracted regarding the droplet shape and size at step 258. At step 260, a list of droplets and information associated with the droplets is stored in a data log, in various examples. The method 250 further includes repetitively detecting and tracking droplets from image frames, and tracking droplets by matching the droplets between frames based upon information obtained from a new frame, in some examples.

Figure 3A:
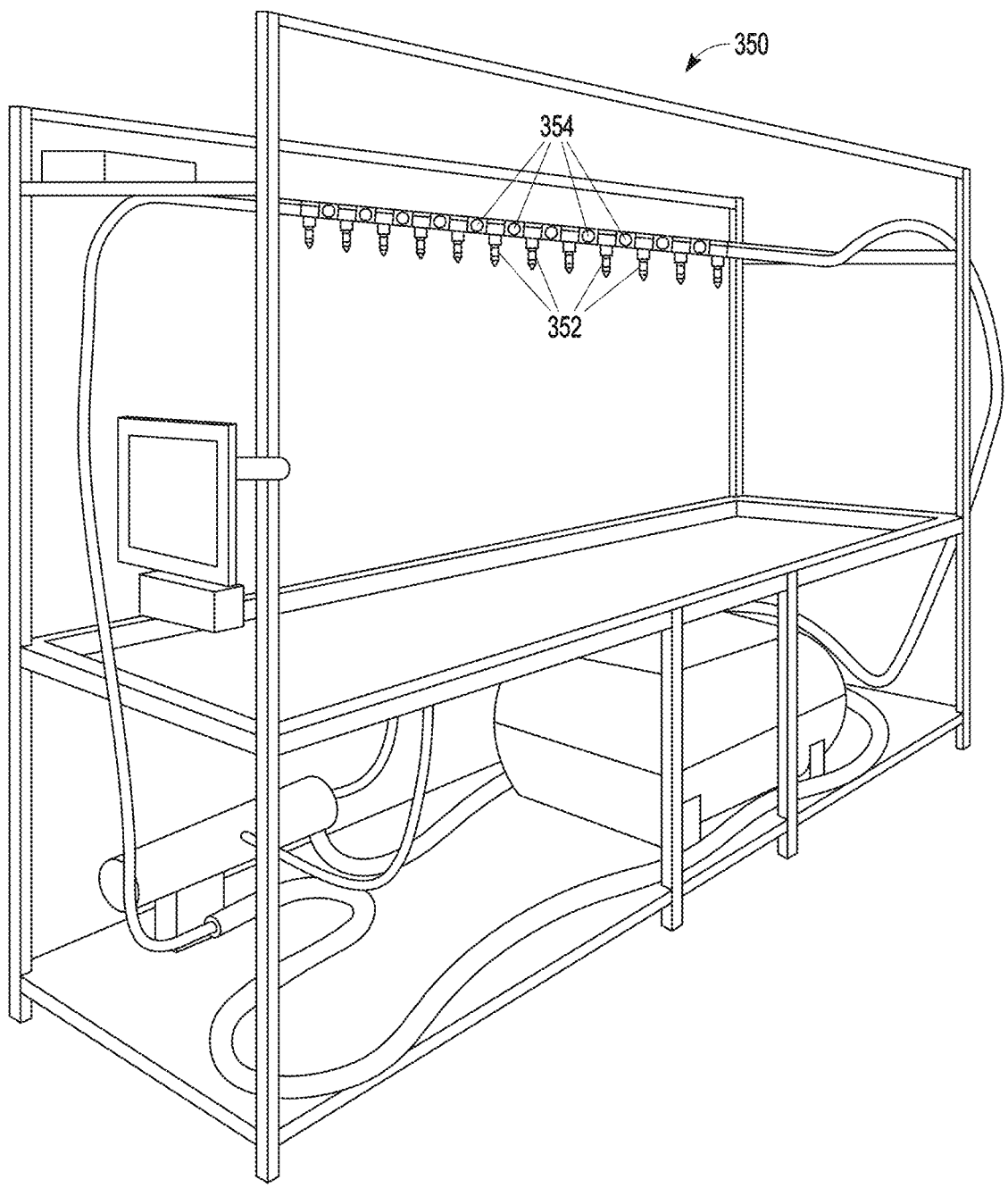

FIG. 3A illustrates a system 350 for droplet data collection including agricultural sprayer nozzles 352, in one example of the present subject matter. An experimental set-up is depicted with crop spray nozzles for droplet data collection. In various embodiments, the depicted sprayer nozzles 352 are used to spray droplets, and one or more sensors 354 are used, such as cameras or other image detecting equipment, to capture one or more frames of an image of the droplets.

Figure 3B:
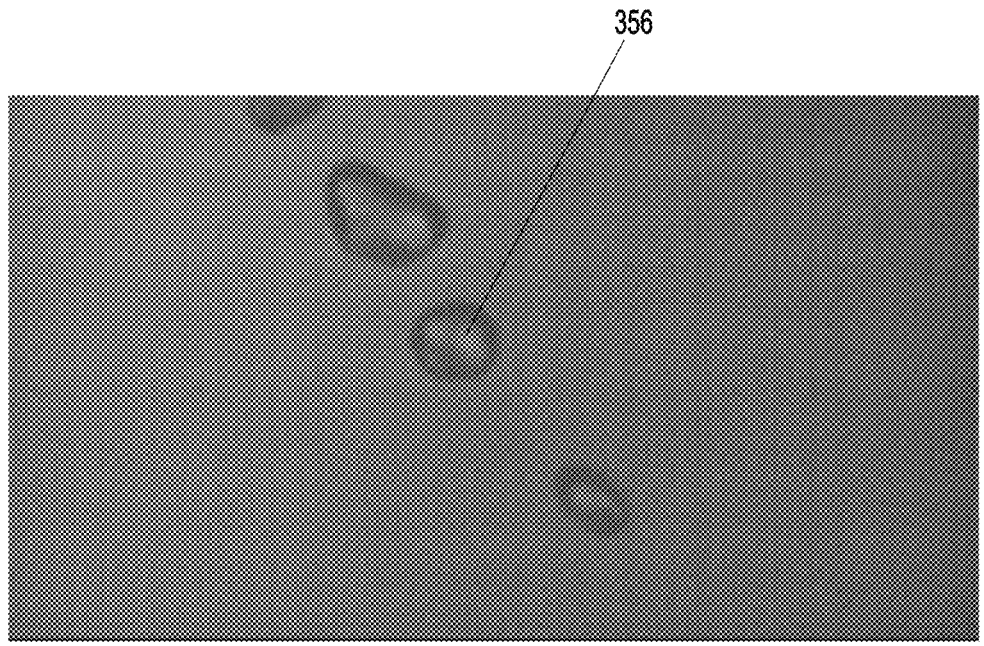
Figure 3C:
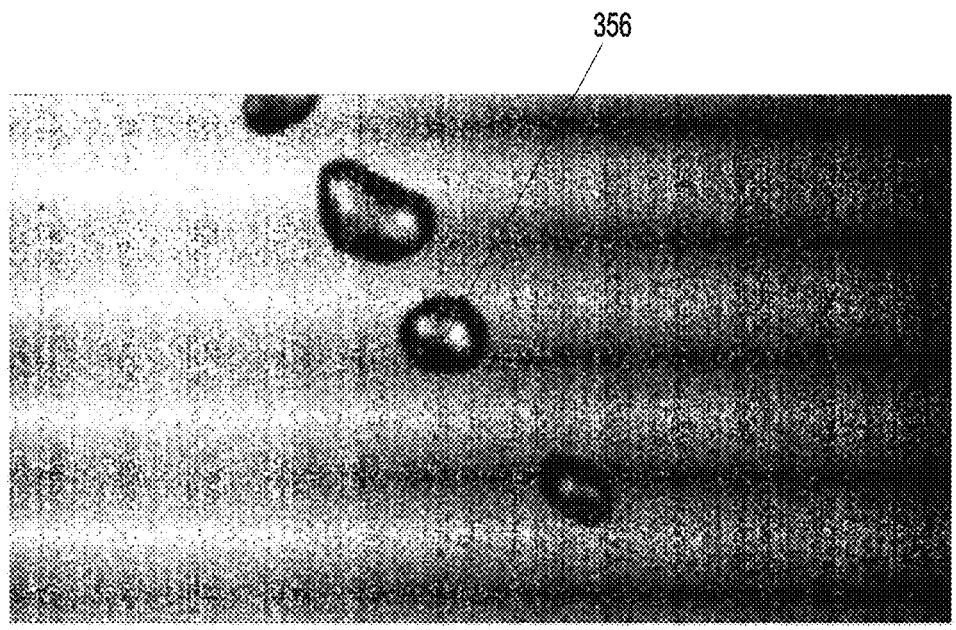

FIGS. 3B-3C illustrate test images containing multiple droplets 356 sprayed from an agricultural nozzle of FIG. 3A, in one example of the present subject matter. The image depicted in FIG. 3B is from a pool of training datasets and the next frame in the dataset does not necessarily have droplets of the same size and the same lighting conditions. The depicted frame may include information that is not useful (disturbances or noisy pixels captured by the camera due to lighting condition etc.). The present subject matter provides mechanisms for removing this unnecessary information from the image frame of FIG. 3B.

In one example, the image is sharpened to increase the contrast level between the pixels of interest that represent droplets and the background pixels, and the image is altered using the Gaussian filter to suppress noise. This Gaussian controlled to prevent the loss of information that may include data of droplets, but noisy pixels are blurred which significantly lowers noise contrast. A range of red, green and blue (RGB) values is used corresponding to a typical droplet's color, and pixels with RGB values outside this range are filtered out and pixels near the frame boundary are cropped off. The results are depicted in FIGS. 3D-3E after sharpening, after filtering, and after cropping, respectively.

Figure 3D:
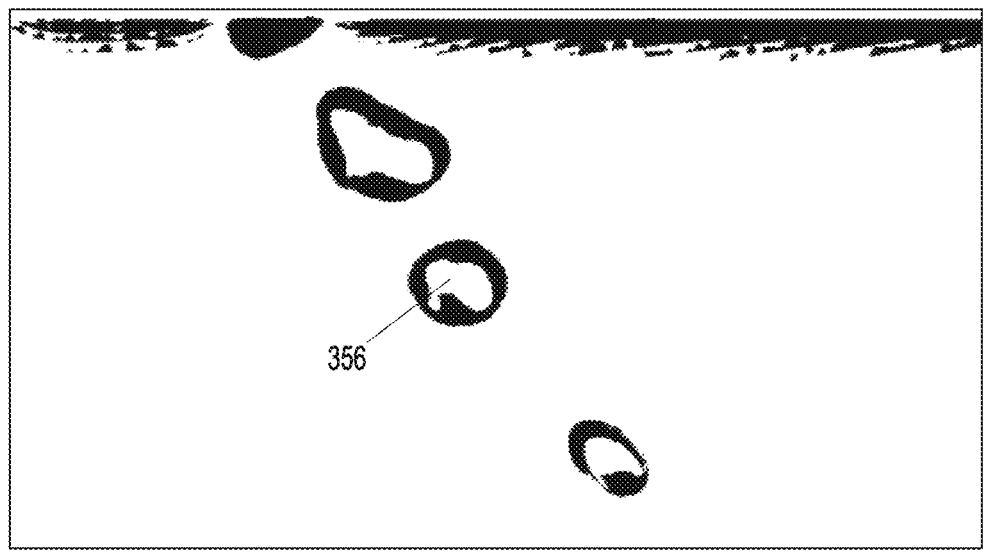
Figure 3E:
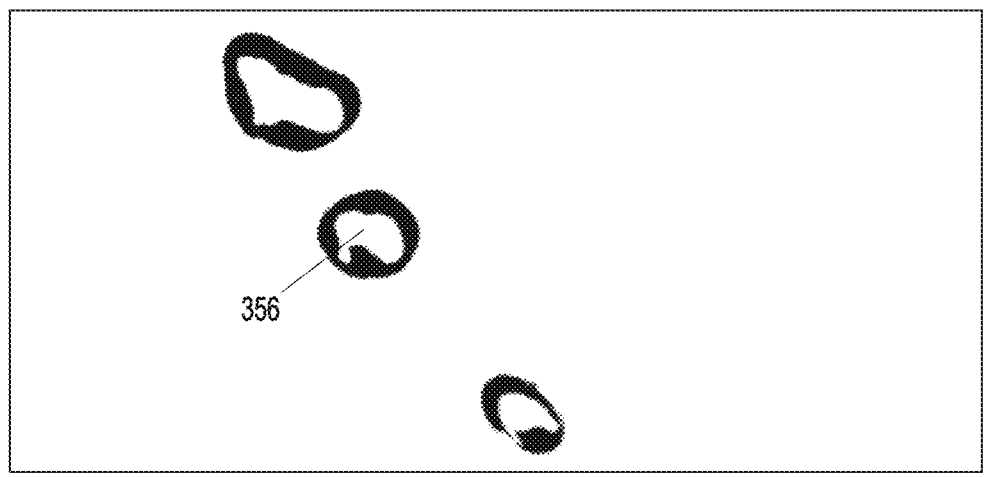

FIGS. 3D-3E illustrate extracted droplets 356 from the image of FIG. 3B using computer vision techniques, in one example of the present subject matter. In FIG. 3C, the image from FIG. 3B is sharpened to enhance visibility of the droplets of interest. In FIG. 3D, the image from FIG. 3C is sharpened to remove noise using a thresholding approach, in an embodiment. FIG. 3E shows a cropped image from FIG. 3D to remove boundary noise.

The present system and method connects black pixels that are close to each other to form contours that define regions of interest (ROI), thus defining regions of the image frame most likely to represent droplets. For example, FIG. 3E shows three regions of interest (ROI) representing three droplets. In one example, the method prevents having any white regions inside the droplets, which may lead to detecting double ellipses (an ellipse inside an ellipse) which would alter the estimation of droplet size and position.

The shapes of droplets can be irregular, thus it is not appropriate to define droplet size and position based directly on the contours of the droplets detected in the image frame. The present subject matter provides for outlining the droplet contours using a standard shape such as an ellipse that best fits the droplets' shapes. After all the noise has been filtered out, and ROI are defined like those depicted in FIG. 3E, the droplet contours can be fitted with ellipses in such a way that they approximate the droplets' shapes. The present subject matter uses the fitted ellipses, or other shape, to calculate the droplet sizes (using the axes of the ellipses, for example) and droplet positions (using the center of the ellipses, for example).

The prior methods of computer vision techniques fails to detect and track droplets when the droplets in a number of situations, such as when droplets have similar color and brightness condition to the background, which makes it difficult to detect and track the droplets since the pixels along the boundary have a low level of contrast. In addition, the droplets may have irregular shapes (not just circles and ellipses) and their shapes may change between the current image frame and a subsequent image frame. Because the droplets are more or less the same size and shape, it is difficult to differentiate a particular droplet from a neighboring droplet between two image frames, and the present subject matter uses an identification method to track each particular droplet. The droplets are dynamic with substantially different positions between image frames, and droplets can be of different sizes depending upon how the image is recorded. For example, if the image is taken from a sensor that is relatively close to the droplets, then droplets appear larger and have more distinct features. However, this is not the case when the video image is recorded from a relatively far distance where all droplets appear smaller and appear to have a similar shape.

The previously mentioned challenges with droplet identification and tracking may occur ubiquitously in all droplet images because of the nature of crop spray systems and the camera/sensor positioning. Classical computer vision techniques as discussed above can be fine-tuned for a particular image capturing system with a specific properties to achieve best performance, but the performance can drastically decrease as the image properties vary during the recording process. Thus, these classical computer based techniques are not adaptive enough to be robust to uncertainties encountered in a crop spraying system.

The present subject matter overcomes these difficulties by providing for droplet detection and tracking using a data-driven method optionally using artificial intelligence (AI). Specifically, the present system may use AI to automate repetitive learning and discovery using image frames from highspeed videos of droplets, and the present system can perform frequent, high-volume, computerized measurement tasks reliably and without additional labor cost. The present approach may adapt through progressive learning algorithms in which AI identifies structures and regularities in droplet imagery data to classify and predict the droplet characteristics, and adapts when given new droplet data. The deep-learning capability of the present system can analyze larger and deeper droplet imagery data resulting in a precise and robust measurement method. Overall, the present system provides for adaptability in the presence of uncertainties and condition variation.

The present system provides for dividing an input image frame into one or more sections, in various embodiments, and formulates and executes a classifier to determine if a droplet is present in each section. In one example, the image frame is divided into N equal sections when the scale is 1. In this example, when the scale is 2, the image frame is divided into 2N equal sections. The present system uses a classifier for each divided section, in various examples, and the time to execute the classifier in each section is t seconds. Each section may contain droplets of multiple sizes in the image frame, and to account for the multiple droplets the present system can use multiple scales 1, 2 . . . n which directly control a total number of sections where the classifier is executed. As n increases, the total time (N+2N+ . . . +nN)t it takes to classify droplets in those sections would also significantly increase. This approach depends upon the user to choose the n value and can be comparatively slower based upon the chosen n value.

Figure 4:

Some methods use a selective search algorithm to determine sections of the image frame, to decrease a number of sections compared to manually selecting sections as discussed above. These image frame sections (also known as a proposals) are selected such that there is a high probability of having droplets in each selected image frame sections. Instead of using all regions in an image, the system then limits the use of a classifier in only the selected sections. A limitation with this approach is that the object detection performance is directly dependent upon the ability of the selective search algorithm to detect regions containing droplets and the ability of the classifier to correctly detect droplets in those regions. In this situation, regardless of the effectiveness of the classifier, a droplet may not be detected if the selective search algorithm misses a region containing the droplet. As an example, FIG. 4 illustrates results of a selective search applied to a test image, in one example of the present subject matter.

An advanced object detector may be used instead of using a selective search algorithm, in various examples. Two existing object detection methods include a Faster region-based convolutional neural network (Faster-RCNN) and a Single Shot Detector (SSD). In various embodiments, the present subject matter employs a Faster-RCNN object detector for increased accuracy of object detection.

Figure 5:
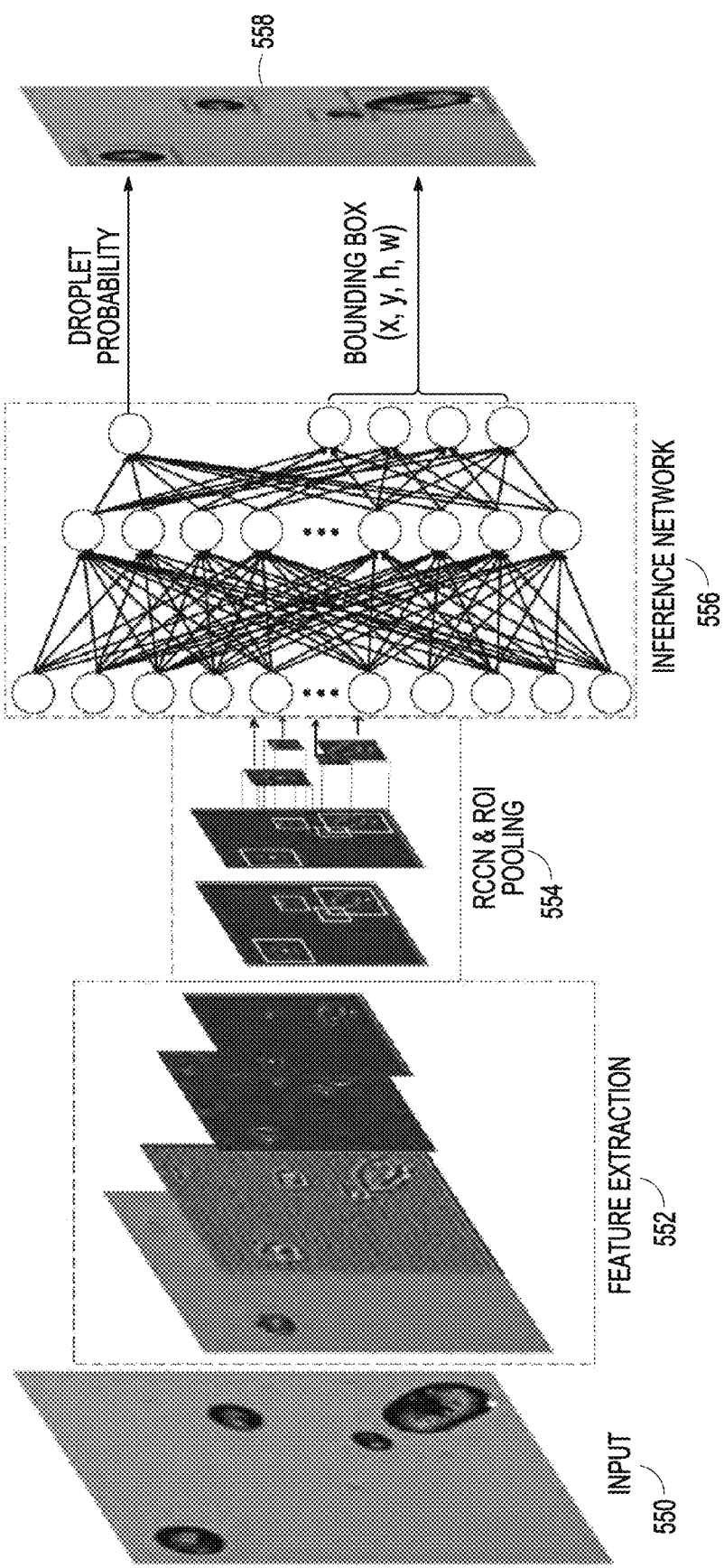

FIG. 5 illustrates a visual representation of Faster-RCNN (region-based convolutional neural network) for droplet detection, in one example of the present subject matter. During the feature extraction process for a droplet in an image frame, a deep neural network is used to extract important characteristics of a droplet that can be used to uniquely identify it from another droplet present in the image frame. An input 550 is received, and a feature extraction process 552 leads to a decrease in image size by a reduction factor. For example, an image of 512 pixels by 512 pixels would be reduced to a final feature map of size 32 pixels by 32 pixels with a reduction factor of 16. Hence, instead of directly using the original image size, the droplet detection algorithm of the present subject matter works with feature maps. Also, the present algorithm achieves this imagery reduction while preserving unique characteristics (features) of each droplet present in the image frame. These features will be the input to a region proposal module in various examples.

Figure 6:
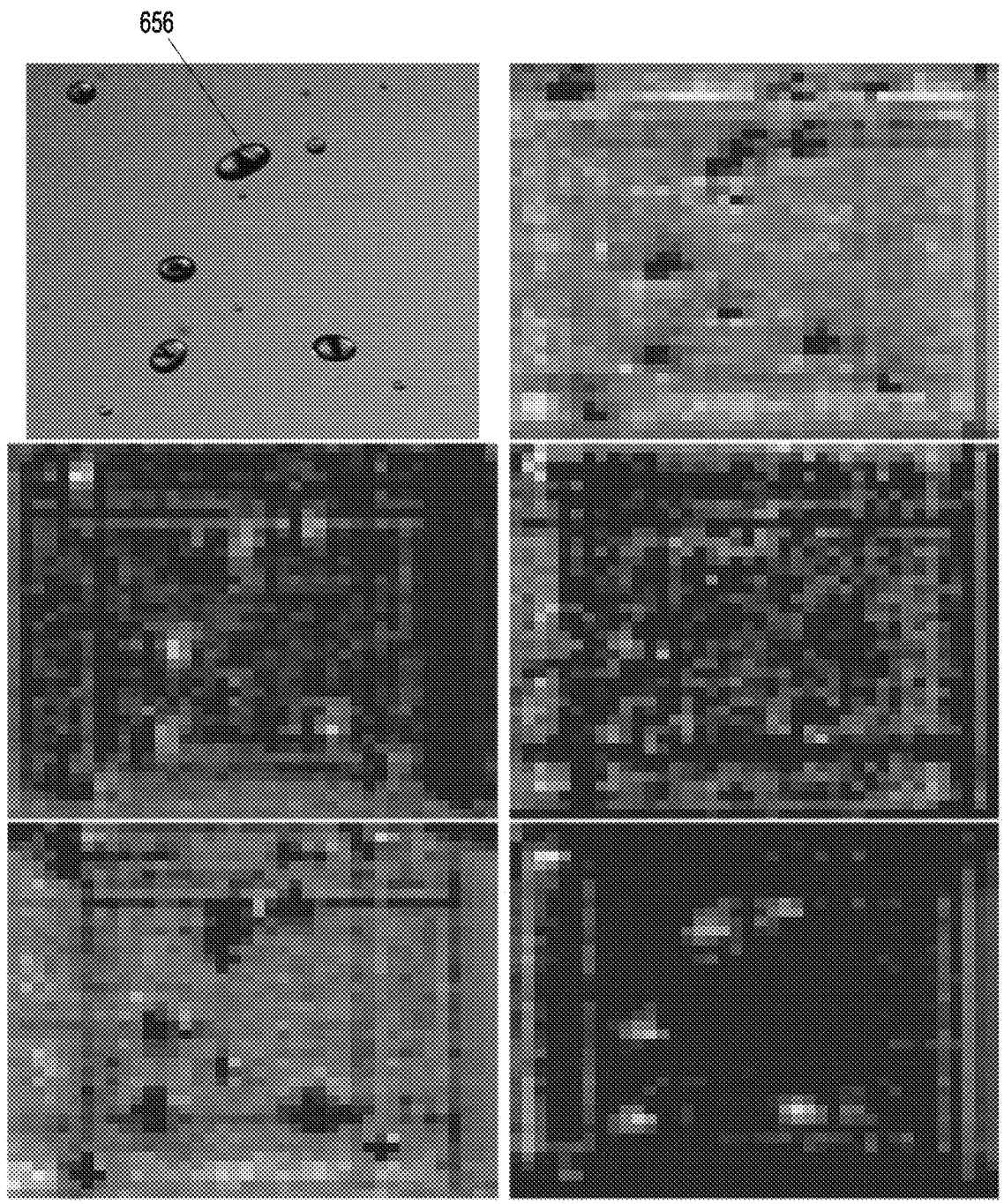

Faster-RCNN 554 has a base network that performs feature extraction known as a backbone of the network, in various examples. The base network can be replaced by another backbone that fits better with the particular task. An example of a backbone is a residual network (ResNet), which is employed in the present subject matter as a template for the base network of the Faster-RCNN, as ResNet allows for training much deeper networks (with many more layers) which otherwise could be prone to a vanishing gradient. In various examples, an inference network 556 provides an output 558 using droplet probability and bounding boxes. In one example, the present subject matter implements a ResNet with 50 layers. Other numbers of layers may be used without departing from the scope of the present subject matter. FIG. 6 illustrates resulting feature maps for identified droplets 656 obtained from applying a residual network (ResNet) to an input image, in one example of the present subject matter.

Figure 7:
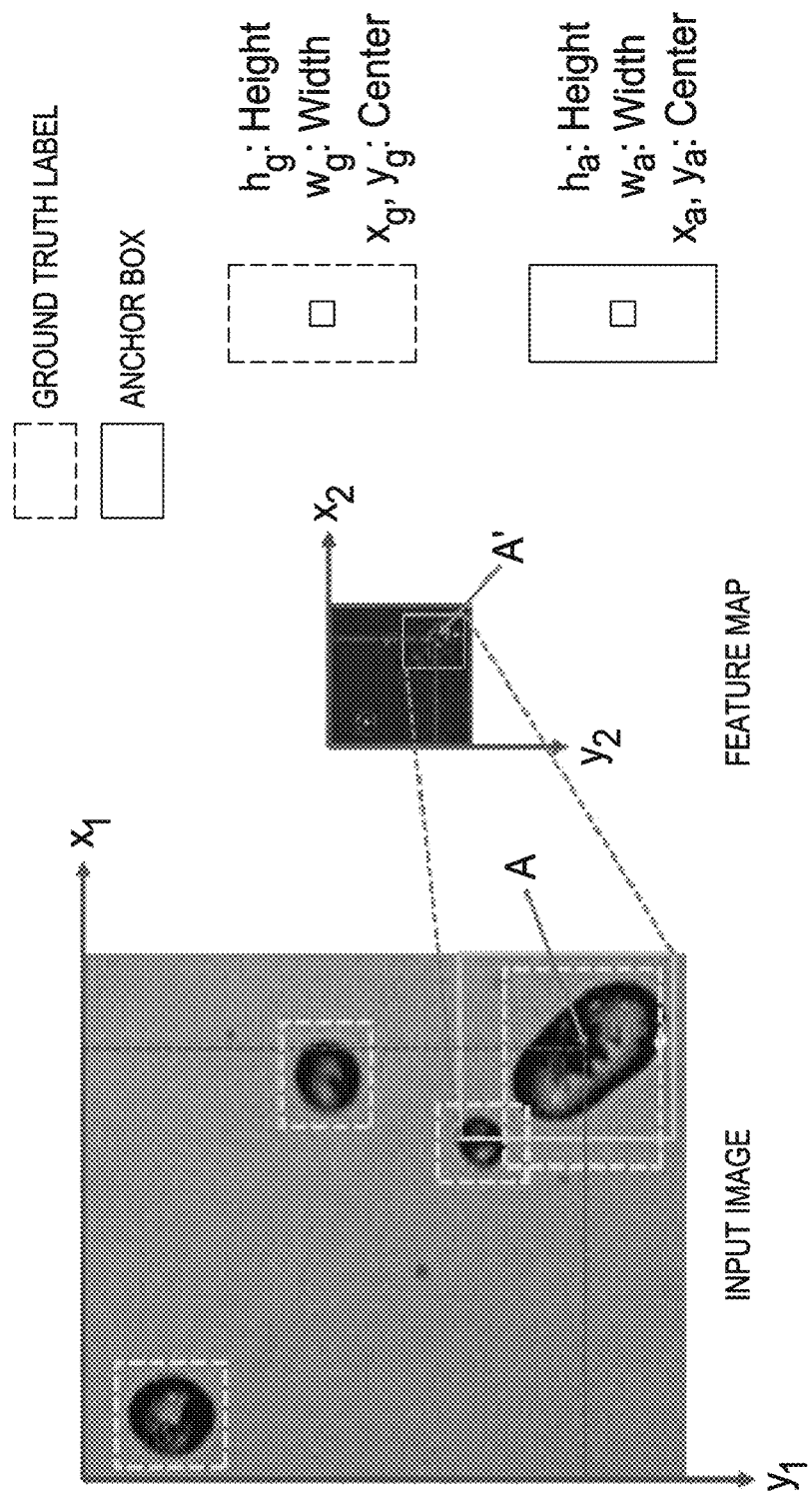

FIG. 7 illustrates anchor boxes in a feature map on an input image, in one example of the present subject matter. In the depicted embodiment, one anchor box is highlighted and multiple ground truth labels are shown for an input image. The present subject matter optionally uses a region proposal network to replace the selective search method described above (illustrated in FIG. 4) with an artificial neural network. In particular, regions are extracted from the input image frame that can contain a droplet. The region proposal module takes a feature map as an input, which is an output from the feature extraction process. For any given pixel coordinates in a feature map, the corresponding pixel location in the input image is computed as depicted in FIG. 7. In each pixel of a feature map, a fixed number of rectangles called anchor boxes are created of different dimensions. For each anchor box in the feature map, a corresponding rectangle is composed as shown in the input image illustrated in FIG. 7. Each of these rectangles covers a section in the input image and each section can have droplets in the section. Therefore, a region proposal neural network is formulated and well-trained with labeled ground truth data to effectively find sections ("regions") that contain droplets with a high probability.

In various embodiments, each training image has a ground-truth label (bounding box). A bounding box includes height, width and center $h_g$, $w_g$, $x_g$, and $y_g$, and an anchor box includes a height, width and center, $h_a$, $w_a$, $x_a$, and $y_a$. The present subject matter defines p* as a target probability of having an object (a droplet or something that appears standing out from the background) in the region covered by a bounding box described by $t^*=[t_x^*, t_y^*, t_w^*, t_h^*]$, where $t_x^*=(x_g-x_a)/w_a$, $t_y^*=(y_g-y_a)/h_a$, $t_w^*=\log(w_g/w_a)$, $t_h^*=\log(h_g/h_a)$. For each pair of a ground truth label and an anchor box, the present system computes a ratio of the area of intersection between the ground truth label and the anchor box over the total area covered by both the ground truth label and the anchor box. For any pair, if this ratio is greater than 0.7, the present system assign p*=1, in an embodiment. Similarly, the present system assigns p*=−1, if the value is less than 0.3, in an embodiment. In all other cases, the present subject matter assigns p*=0, in various embodiments.

For a given input feature map, the region proposal network of the present system produces a set of numbers $p_i$ and $t_i$. The parameters of the neural network are tuned by the present system via an optimization scheme until the neural network produces $p_i$ and $t_i$ values that converge to the target values $p_i^*$ and $t_i^*$. The optimization scheme aims to minimize total loss of region proposal formulated as $$L_{rpn} = \frac{1}{256}\sum_i L_{cls}(p_i, p_i^*) + \frac{0.5}{48000}\sum_i p_i^* L_{reg}(t_i, t_i^*),$$

$L_{cls}$ is the classification log loss and $L_{reg}$ is the regression loss.

The present subject matter performs Region-of-Interest (RoI) pooling, in various embodiments. From the above region proposal, numerous $p_i$ and $t_i$, are generated, where $p_i$ is the probability of having an object in the region covered by a bounding box described by $t_i$. In various examples, not all regions are of the same size (height and width). ROI pooling is used to resize each region obtained from the region proposal to have a fixed size, in various embodiments. The outputs of the RoI pooling process are regions of the same size that may contain droplets or other objects, for example things in the background.

As shown in FIG. 5, an inference module can be used as a refinement step in addition to the above processes. The inference module formulates another neural network that takes the above regions as inputs, and output regions with probability of containing only droplets (excluding other objects visible in the frame). In particular, the outputs are $u_i$, the probability of a region i containing a droplet and $v_i$, the location and size of the region i. The present system employs a stochastic gradient descent optimization scheme to tune the neural network parameters to minimize the following loss function:

$$L_{fast} = \frac{1}{64}\sum_i L_{cls}(u_i, u_i^*) + \frac{1}{300}\sum_i u_i^* L_{reg}(v_i, v_i^*),$$

With a target probability $u_i^*=1$ if region i contains a droplet indicated from the ground truth and $u_i^*=0$ if that region does not contain a droplet, v* is obtained from the ground truth. In various examples, $L_{cls}$ is the classification log loss and $L_{reg}$ is the regression loss.

In order to compute the performance of the system, the trained network was used on a set of evaluation images. Each evaluation image has a ground truth, in which every droplet in each evaluation image is manually labeled with a bounding box. Hence, the ground truth is the best possible performance resulted from careful inspection by a human operator. Each image was passed through a trained model and the results were compared with the ground truth, storing the following information for each image: (1) a total number of droplets missed by the trained model ($M_D$) for a given image when compared to its ground truth, (2) a total number of incorrect detections ($F_D$) made by the trained model for a given image when compared to its ground truth, which can occur when the trained model detects a droplet but the ground truth does not consider it as a droplet, (3) a total number of detections by the trained model for the given image ($D_T$), since not all detections contain droplets, for example $F_D$ consists of detections counted in $D_T$ that are not droplets when compared to the ground truth, (4) true detection ($T_D$) which is computed by subtracting total number of droplets detected by the trained model for the given image with the total number of incorrect detections for that image, and (5) accuracy which is computed as $$\frac{T_D}{T_D + F_D + M_D}.$$

With this set of metrics, the analysis penalized for every missed detection and any wrong detection. As described, the value of accuracy will be 1 if the droplet detector result exactly matches the ground truth. With multiple images, overall accuracy is the average accuracy over all the experimental images. The accuracy defined here will be used as a performance metric to quantify the ability of the model to detect droplets. With the performance metrics defined, the training process and droplet detection results can be analyzed.

The present subject matter performs training by collecting images containing droplets and creating a database with all the collected images. The present system implements image augmentation to increase the size of the database. In addition to increasing the size of training data, augmentation can yield better classification results. For every image, the system labels the regions and provides the ground truth. The system divides the database into three different sets: train, dev, test. Every image includes the ground truth for that image. The train dataset contains images for training the object detector. The Faster-RCNN model of the present system learns from images within the train dataset during the training process. The dev dataset is generally used to evaluate the performance of a model, in various examples. The model occasionally sees these images during the training process. The test dataset contains images which the model has never seen before. These images inside the test dataset are used to compute the accuracy of the trained model. In one example, the train dataset has 470 images, the test dataset has 44 images and the dev dataset has 47 images. The 470 images in the train dataset contains around 4907 droplets, in an example. Similarly, the dev dataset contains 630 droplets, while the test dataset contains 600 droplets in an example.

In various embodiments, anchor boxes are a set of pre-defined bounding boxes and are used for object detection in a Faster-RCNN analysis. Anchor boxes can be bounding boxes where the network initially predicts the probability that a set of pixels are a droplet or background objects, in various examples. The present algorithm refines each anchor box as it learns the location of droplets from the ground truth. Based upon the correction made using the anchor box, the network reports the coordinates of the bounding box enclosing the droplet. Hence, an anchor box can be thought of as an initial guess for the bounding box.

Figure 8:
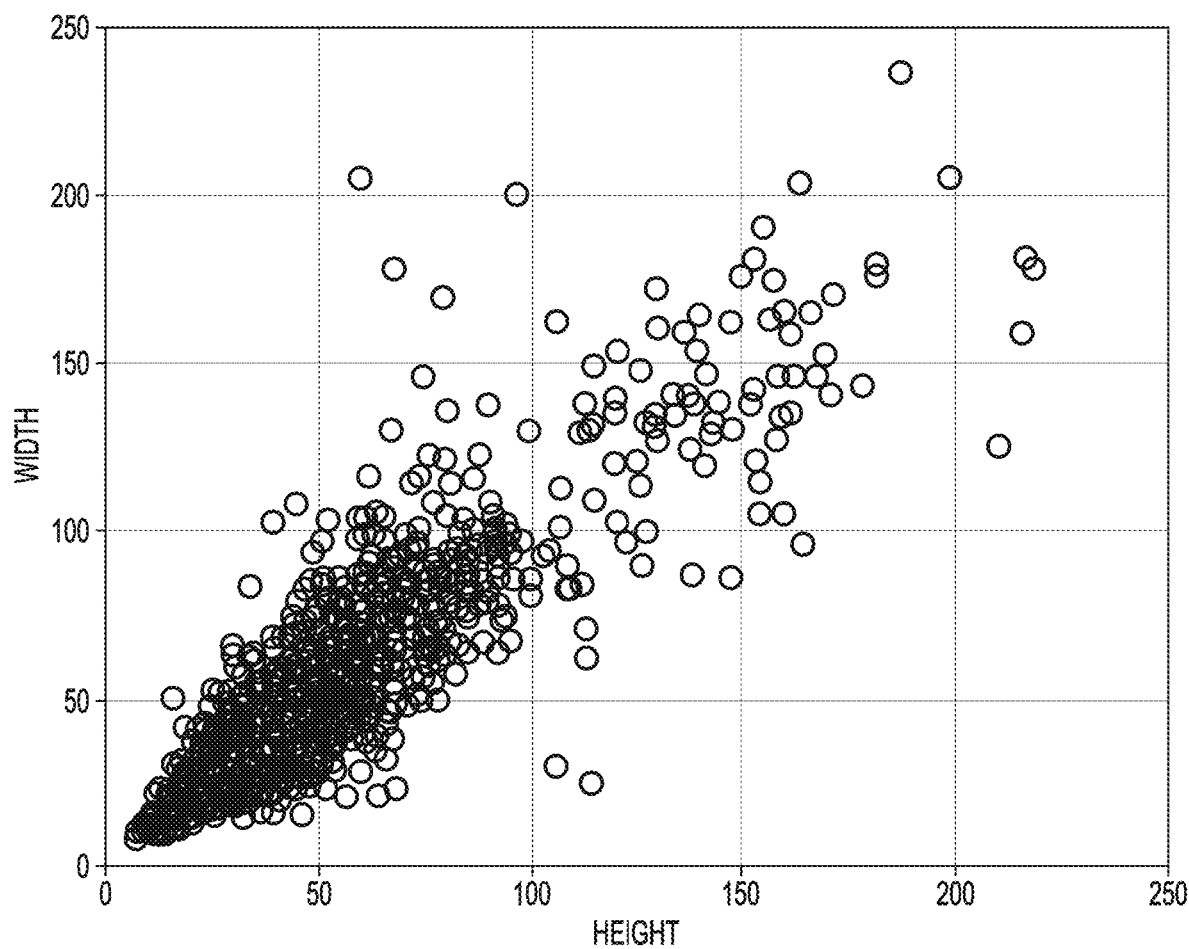

In various examples, the size of an anchor box is defined in terms of by an aspect ratio (width/height), r, and a scale factor, s, and base anchor height and width as: the height of an anchor box=(height of base anchor)*(s$\sqrt{r}$) and the width of an anchor box=(width of base anchor)*(s$\sqrt{r}$). The value of 256 is chosen for both height of a base anchor and the width, in an example. Using input training data, the present system was used to extract every bounding box for that data, and the result is plotted in FIG. 8 illustrating a graph of width v. height for training data, in one example of the present subject matter.

Figure 9:
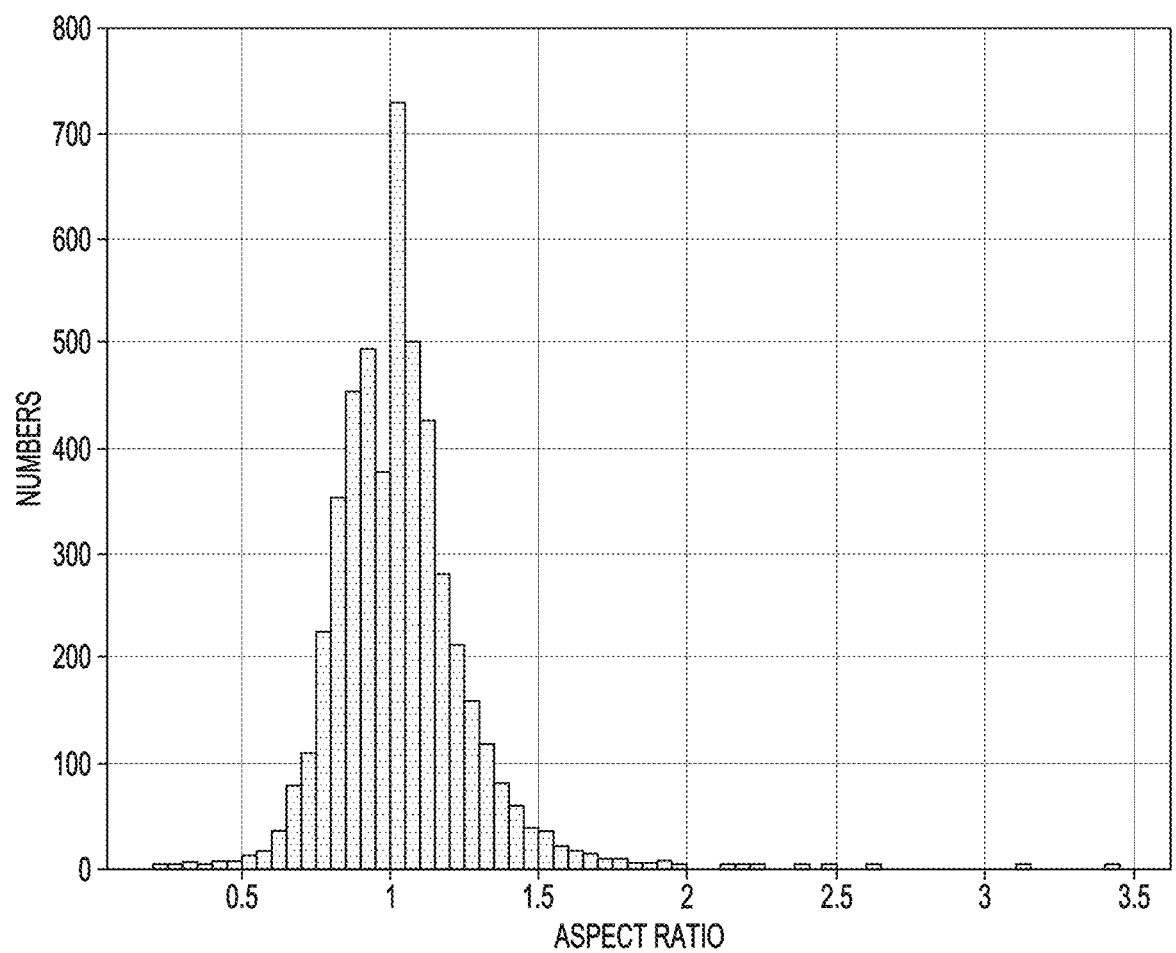

FIG. 9 illustrates a graph of aspect ratios rations of bounding boxes for training data, in one example of the present subject matter. From the histogram shown in FIG. 9, most of the droplets in the training data lie within the aspect ratio of 0.5 to 2. Some of the droplets are spread outward with an aspect ratio between 2 and around 3.5, in an example. With the known information about the aspect ratio of droplets, the anchor boxes were chosen to capture the region containing droplets. Thus, anchor boxes were used with the aspect ratio of 0.5, 1, 2, 3 from the aspect ratio of droplets. In addition, an anchor scale of following values of 0.08, 0.25, 0.5, 1.0, 1.5, 2.0 are used, in an example. These parameter values lead to 24 anchor boxes at each pixel location in a feature map.

Figure 10:
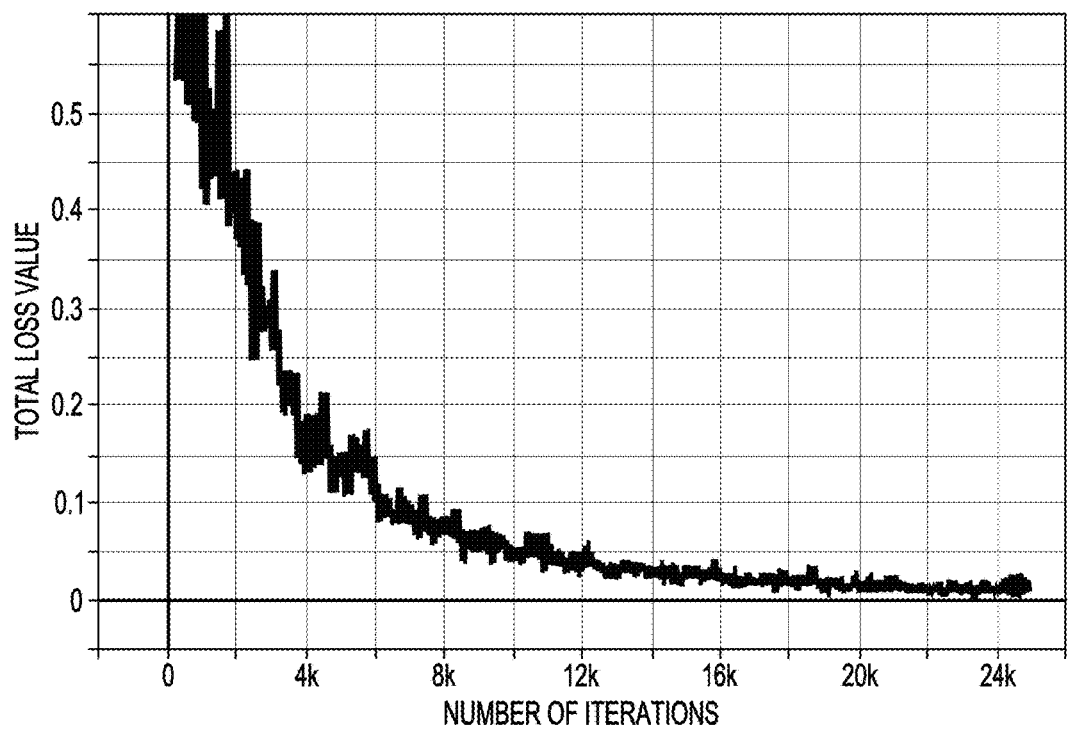

FIG. 10 illustrates a graph of total loss value for iterations, in one example of the present subject matter. The lightly shaded lines in the graph represent the actual total loss, whereas the darkly shaded lines represent a result obtained from applying an exponential moving average with a smoothing factor value of 0.6, in one embodiment. After completion of Faster-RCNN model training, the total loss of data is shown in FIG. 10, illustrating a loss of than 5% when the number of training iterations is over 2000. The total loss represents the model learning progress made over train data, in an example, but does not translate directly to the droplet detection accuracy with unseen images.

To compute accuracy, the trained model is used to detect droplets for each image stored inside the test folder. For every detection made by the model, a confidence value (score) associated with the detection is calculated, in one example. Detections with confidence level below a confidence threshold, which is set to 0.9 to minimize $F_D$ and $T_D$ in an example, are discarded. The value of the confidence threshold can be varied in various embodiments. A high confidence threshold will lead to droplet detections with high confidence, but fewer droplets are detected and valid droplet detections may be discarded. In contrast, a low confidence threshold will lead to more droplets detected but also more false detections. The accuracy of the trained Faster-RCNN model when used to detect droplets with images the program has never seen is listed in the following table:

Accuracy computed for Faster-RCNN model for the test folder

| Total droplets | $M_D$ | $F_D$ | $D_T$ | $G_T$ | $T_D$ | Average accuracy |
|---|---|---|---|---|---|---|
| 600 | 47 | 12 | 562 | 600 | 550 | 0.9078759% |

The trained Faster-RCNN model produces an overall accuracy of approximately 90%. Additionally, the total number of missed detections, $M_D$, is greater than the total number of false detection, $F_D$, given the high value of the confidence threshold. As an example, FIG. 11A illustrates $M_D$, $F_D$, $D_T$, $G_T$, $T_D$ reported for a sample image from test folder.

Figures 11A, 11B:
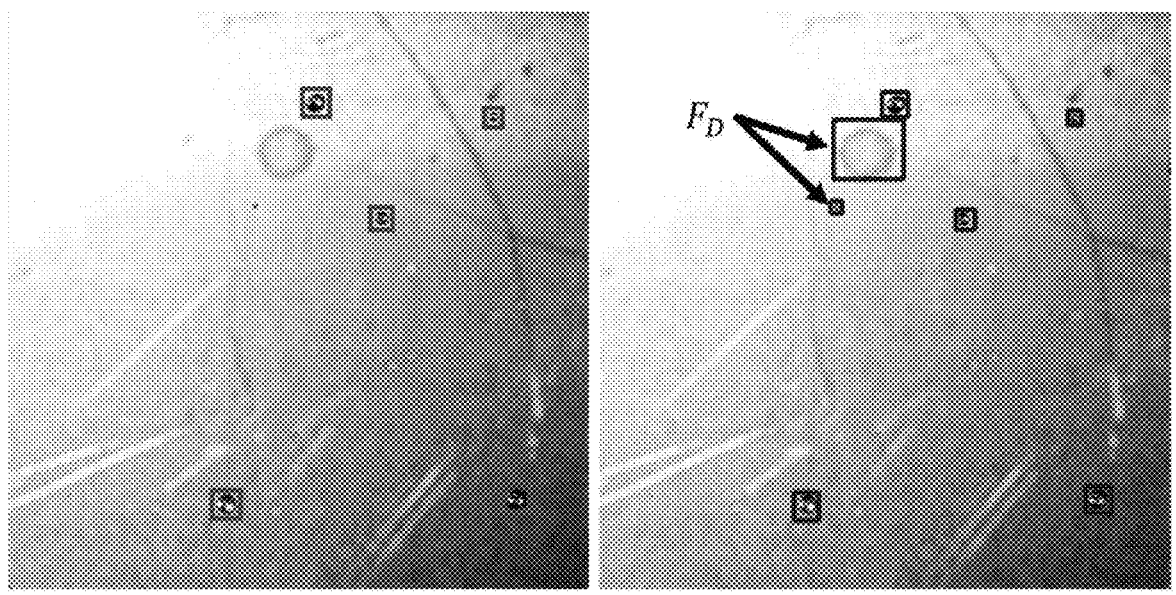

FIGS. 11A-11B illustrate ground truth of a sample image, in one example of the present subject matter. FIG. 11A shows ground truth of a sample image, and FIG. 11B shows the trained model droplet detection for the sample image. In the depicted embodiment, the model detects a small droplet that was not in the ground truth and a big droplet-like object. In this case, the values are $F_D=2$, $M_D=0$, $D_T=7$, $G_T=5$, and $T_D=5$.

Figure 12:
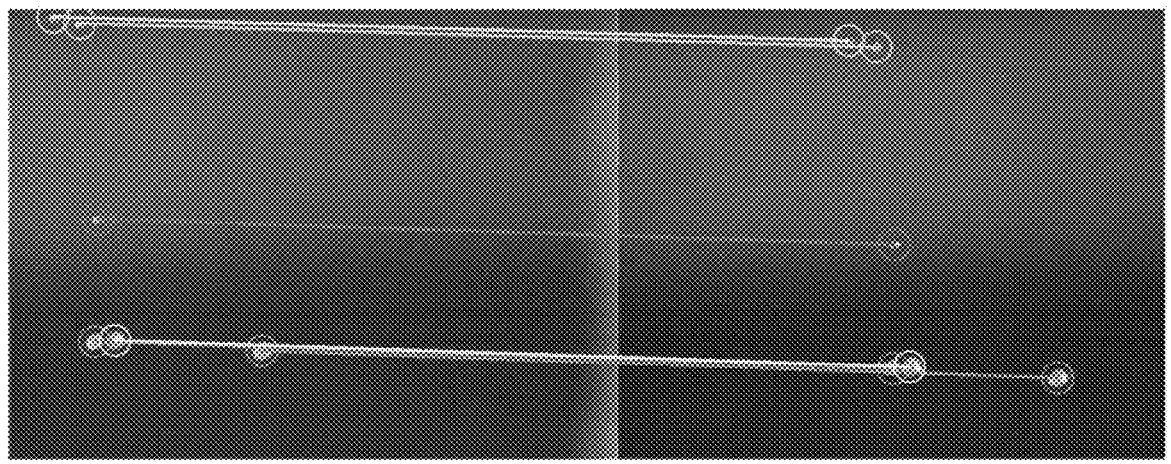

The deep-learning algorithm detects droplets in a given image frame, in various examples. The detection algorithm considers images as independent and neglects the information implied between images, namely the dynamics of each droplet governed by physical laws, and is used to measure droplet size. The present system further relates droplets between frames, inferring dynamics information of each droplet, labelling each droplet, and then monitoring motion of the droplet between successive images. The present tracking algorithm is used when measuring droplet velocities. The problem of relating droplets between frames depicted in FIG. 12 is solved via a "correspondence matching" algorithm of the present system. FIG. 12 illustrates an image of droplets in a frame, in one example of the present subject matter. In various embodiments, droplets in a frame $k_1$ will be matched to another frame $k_2$, where frame $k_2$ comes after $k_1$.

Various embodiments of the present system execute a correspondence matching module. In order to match a droplet in multiple image frames, each droplet is described using a vector (or a descriptor). Vectors can be compared in successive images in order to establish a similarity relationship with vectors, for droplet tracking. In one embodiment, a descriptor is described using the equation:

descriptor=$[C_x, C_y, \rho, A, E, T]$

Figure 13:
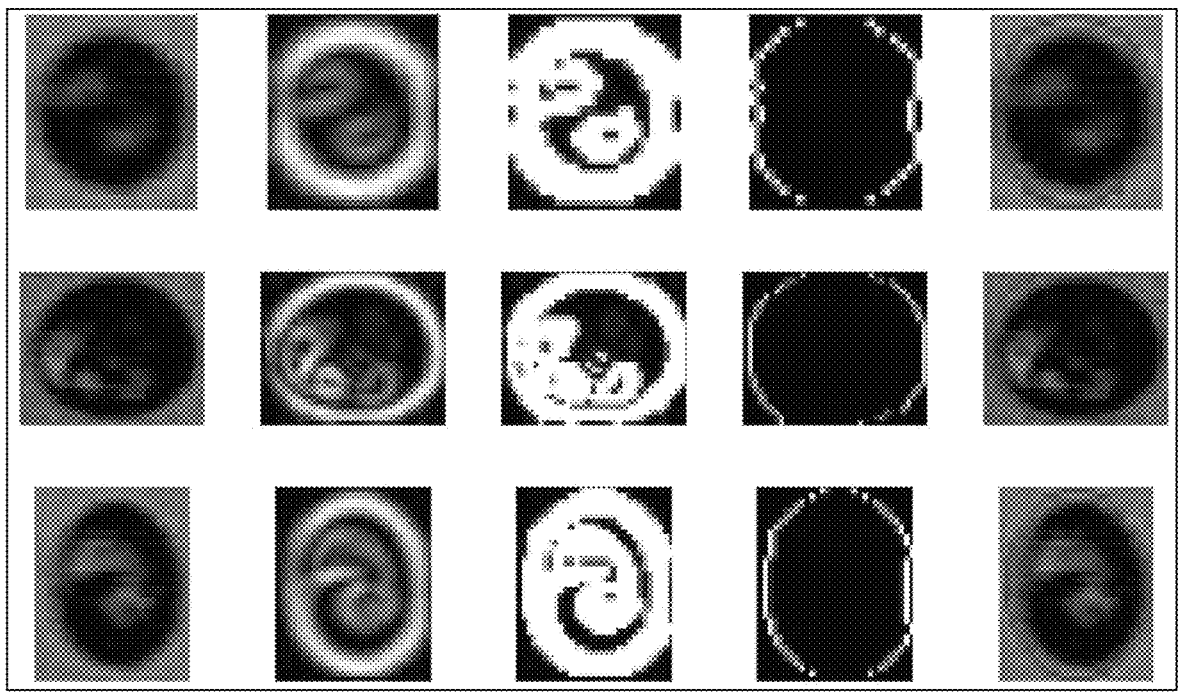

In this embodiment, $C_x$ and $C_y$ are the x- and y-coordinates of a droplet center, $\rho$ is the perimeter of a droplet, A is the area of a droplet appearing in an image, E is the eccentricity of a droplet, and $T=(4\pi A)/\rho^2$ is the thinness ratio. To extract descriptor information for each droplet as defined above, the present system executes the following steps: extracting each droplet detected by the trained model, and transforming rectangular boxes into best fit ellipses; converting each of the extracted images to grayscale where each pixel has a value between 0 (black) and 255 (white); applying the Sobel-Feldman operator to recreate droplet images emphasizing the boundaries between droplets and the background, where for example, the second column in FIG. 13 is the result of applying this step to the grayscale images of droplets; converting the resulting image to black and white using a threshold approach, specifically, any pixel values greater than or equal to the threshold value of 45 are converted to values of 255, while any values less than the threshold are converted to a value of 0, where for example, the third column in FIG. 13 shows the result of applying thresholding to the images on second column; extracting the outermost boundary surrounding each droplet as shown in the fourth column in FIG. 13; and fitting an ellipse using a least-square approach, as shown in the fifth column in FIG. 13. FIG. 13 illustrates droplets extracted from an image and converted to grayscale, in one example of the present subject matter. From left to right in FIG. 13, each droplet is extracted from the test image and converted to grayscale. A Sobel operator is then applied, and thresholding is applied to convert the image to black and white. The outermost boundary is extracted and finally, an ellipse is obtained to best match the droplet, in various embodiments.

Figure 14:
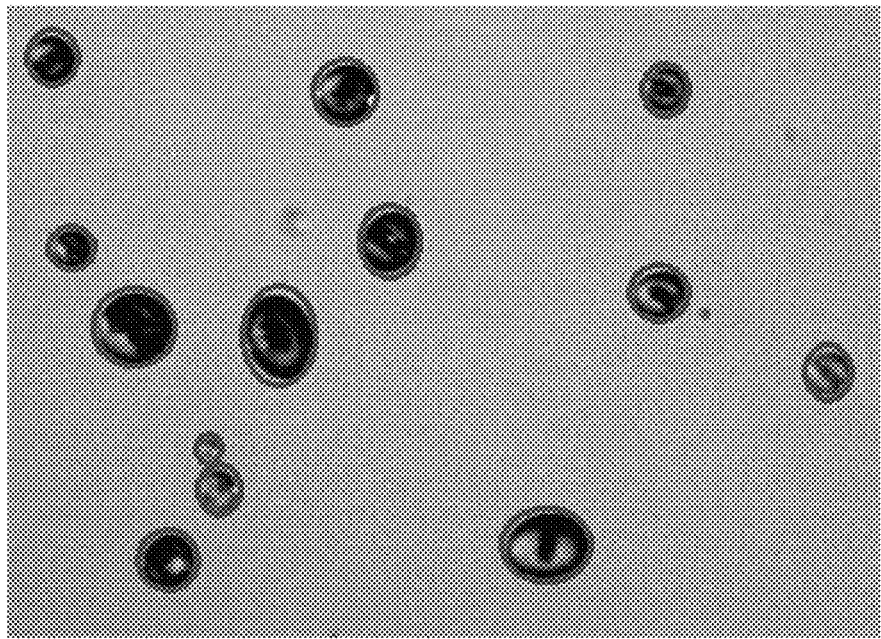

Applying the above-discussed method provides a set of descriptors defined in associated with ellipses fitting all droplets in an image frame as depicted in FIG. 14. FIG. 14 illustrates ellipses fitted to droplets in an image, in one example of the present subject matter. In the depicted embodiment, ellipses are fitted to all droplets in an image taken from the database. The trained model of the present subject matter detects all droplets in the image and each droplet goes through a process of fitting an ellipse around the image of the droplet, in various embodiments.

In various embodiments, the present system matches a descriptor in a frame with the corresponding descriptor in the next frame, thereby tracking a droplet in successive image frames. Matching is achieved by developing a relationship between descriptors across consecutive frames. Given two descriptors, the Bhattacharyya distance is computed as:

$$D_B(p, q) = \frac{1}{4} \ln\left(\frac{1}{4}\left(\frac{\sigma_p^2}{\sigma_q^2} + \frac{\sigma_q^2}{\sigma_p^2} + 2\right)\right) + \frac{1}{4}\left(\frac{(\mu_p - \mu_q)^2}{\sigma_p^2 + \sigma_q^2}\right)$$

In this equation, $\sigma_p$ is the variance of p descriptor, $\sigma_q$ is the variance of q descriptor, $\mu_p$ is the mean of p descriptor and $\mu_q$ is the mean of q descriptor. In addition, the present system computes the Cartesian distance ($D_C$) between two droplets centers whose locations in image are known, in an embodiment. In various embodiments, the system defines the cost value as a linear combination of $D_B$(p, q) and $D_C$(p, q):

$$\text{cost}(p,q)=0.5D_B(p,q)+0.5D_C(p,q)$$

In some examples, both $D_B$ and $D_C$ play a role in the matching decision as droplets appear more circular as they get smaller in the image. As a result, for relatively smaller droplets, it becomes more difficult to distinguish them by comparing descriptors. When descriptors are too similar to make unique distinction, various embodiments use the Cartesian distance to match droplets.

In one embodiment where l is the number of droplets detected in a frame k, all droplet descriptors are in set $R_k=\{r_1, r_2, \ldots, r_l\}$. Various embodiments of the present system match the descriptors in set $R_k$ to another set $R_{k+1}=\{s_1, s_2, \ldots s_m\}$ containing m droplet descriptors from the next frame k+1. The system defines the cost matrix A with the (i, j) entry using the equation:

$$A[i,j]=\text{cost}(r_i,s_j), i=1,2,\ldots,l \text{ and}, j=1,2,\ldots,m$$

Each row of matrix A contains the droplet descriptors which are matched with the droplets stored in a column of the matrix, in various embodiments. The system can use a Hungarian method (a combinatorial optimization algorithm commonly used to solve matching or assignment problems) to find a unique match for each row with each unique column, such that a match is concluded when the corresponding cost function is minimal. By providing a unique match for a droplet, the system prevents matching of a droplet in an image frame with more than one corresponding droplet image in a subsequent frame. This unique match comes at a cost: when $l \neq m$, some droplets in frame k might not be present in frame k+1, or vice versa, and the algorithm returns false matches. To minimize these errors, in various embodiments the present system removes any match that implies a droplet is moving upward, because all droplets are sprayed downward under the nozzle pressure and the influence of gravity. In various embodiments, the system also removes any matches associated with a significant change in droplet location as compared to the remaining droplets in that frame, since droplets are moving with similar velocities and their displacement between consecutive frames should be similar. Thus, the present system minimizes errors in correspondence matching and effectively eliminates false matches caused by new droplets entering a video frame.

Another source of tracking errors is produced by new droplets that come into an image frame while others are leaving the frame. As a result, the correspondence matching algorithm discussed above (and shown in Algorithm 1 below) may leave some unmatched descriptors in both frame k and k+1. In one example, several droplets in $R_k$ exit the frame k and thus do not appear in frame k+1 ($R_{k+1}$). The present subject matter removes these droplets and no longer tracks them in subsequent frames. In another example, several unmatched droplets in $R_k$ still exist in frame k+1 but were not detected by the detection algorithm. The present subject matter runs a Kalman filter prediction and stores the predicted state of these droplets. The correspondence matching is then used to match these droplets in subsequent frames. In yet another example, some new droplets enter in $R_{k+1}$ and are not matched. The present system then assigns new IDs for the new droplets as they are detected for the first time. In a further example, some unmatched droplets in $R_{k+1}$ were present in the frame k but were not detected by the detection algorithm in frame k+1. The present system then runs a Kalman filter prediction and stores their predicted state. The correspondence matching matches these droplets in upcoming frames, in various embodiments.

Thus, the Kalman filter enables state prediction for droplets that are not matched. To minimize errors and improve tracking performance, the present system formulates and implements a Kalman filter in addition to the correspondence matching as discussed above. The use of the Kalman filter is divided into a prediction phase and an update phase. In the prediction phase the Kalman filter predicts the future state of each detected droplet. Therefore, even if a droplet in a given frame k is not matched with any droplets in the next frame k+1, the present system can predict the state of the unmatched droplet, and then use the predicted state to match the droplet to a corresponding droplet in the next new frame k+2.

In one example, $\vec{x}_{k|k}$ is a column vector containing the position and velocity of a droplet at frame k. In one example, the present system detects a droplet at frame k−1, such that $\vec{x}_{k-1|k-1}$ is known, and the system fails to detect this droplet at frame k, such that $\vec{x}_{k|k}$ is not known. This unknown state is predicted via the following equation:

$$\vec{x}_{k|k-1}=F\vec{x}_{k-1|k-1}+Bu_k+w$$

In this equation, w is the gaussian process noise and F is the state-transition model matrix and B is the control input matrix both of which are defined as:

$$F = \begin{pmatrix} 1 & 0 & \Delta t & 0 \\ 0 & 1 & 0 & \Delta t \\ 0 & 0 & 1 & 0 \\ 0 & 0 & 0 & 1 \end{pmatrix}$$

$$B = \begin{pmatrix} 0 \\ 0.5\Delta t^2 \\ 0 \\ \Delta t \end{pmatrix}$$

In this equation, $\Delta t$ is the time interval between the two frames and $u_k$ is the gravitational acceleration. In one embodiment, the accuracy of the estimation is represented by an estimate covariance matrix $P_{k|k}$. In parallel with the state prediction, the present system predicts the estimate covariance matrix by the equation:

$$P_{k|k-1}=FP_{k-1|k-1}F^T+Q$$

In this equation, Q is the covariance of the process noise. This equation predicts the new position of the droplet based upon its previous state.

In the update phase, the observation and probability information is incorporated into the state estimation to prepare for the next frame prediction with the following set of equations:

$$\vec{y}_k=\vec{z}_k-H\vec{x}_{k|k-1}$$

$$S_k=HP_{k|k-1}H^T+R$$

$$K_k=P_{k|k-1}H^TS_k^{-1}$$

$$\vec{x}_{k|k}=\vec{x}_{k|k-1}+K_k\vec{y}_k$$

$$P_{k|k}=(\mathbb{I}-K_kJ)P_{k|k-1}$$

In these equations, $z_k$ is the state measurement at frame k, and H is the observation model matrix defined as $$H = \begin{pmatrix} 1 & 0 & 0 & 0 \\ 0 & 1 & 0 & 0 \end{pmatrix}.$$

This measurement transition matrix provides for tracking of measurements (droplet detection) in terms of the position but not the velocity of the droplet. In addition, $\vec{y}_k$ is the prediction error, R is the covariance matrix of the observation noise, $S_k$ is the pre-fit residual, and K is the Kalman gain.

After the Kalman filter is initialized, the inputs to the Kalman filter are $\vec{x}_{k-1|k-1}$ and $P_{k-1|k-1}$, while the outputs are $\vec{x}_{k|k}$ and $P_{k|k}$. If the measurement $\vec{z}_k$ is available, and hence the droplet is detected at frame k, then $\vec{x}_{k|k}$ and $P_{k|k}$ are computed by the above equations. If the measurement $\vec{z}_k$ is not available, the droplet is not detected, then the system sets $\vec{x}_{k|k} = \vec{x}_{k|k-1}$ and $P_{k|k} = P_{k|k-1}$.

In various embodiments of the Kalman filter implementation, the following parameters are used: the time interval between iterations is set to $\Delta t=0.0004$, which is computed using the total number of frames captured by the image sensor per second (fps); the initial covariance matrix $P_{1|0}$ is a 4 by 4 zero matrix; R is set as 0:01I; and the noise covariance matrix Q is set as:

$$Q = 0.01 \begin{pmatrix} \Delta t^4/4 & 0 & \Delta t^3/2 & 0 \\ 0 & \Delta t^4/4 & 0 & \Delta t^3/2 \\ \Delta t^3/2 & 0 & \Delta t^2 & 0 \\ 0 & \Delta t^3/2 & 0 & \Delta t^2 \end{pmatrix}.$$

According to various embodiments, the present system provides a tracking framework for tracking droplets in successive image frames. As discussed above, the present system and method extracts the descriptor for each droplet, and using descriptor information, matches droplets among frames. The system can use a Kalman filter for state prediction and updates to mitigate the effect of missed and false droplet detections on droplet tracking. These steps provide a droplet tracking framework as shown in Algorithm 2 below. In this algorithm, the following variables and the values they store include:

current_bbox: For every new frame, the system executes a trained model to perform droplet detection. The output from droplet detection includes bounding boxes (rectangles) for the detected droplets appearing in the image frame. The system stores the coordinates of two corners of the rectangle: top left and the bottom right to describe the rectangle. Thus, the current_bbox is a two dimensional array with four columns representing these four coordinates and the number of rows equal the number of detected droplets in the given frame, in an embodiment.

current_descriptor: As discussed in the last section, the present system extracts a descriptor for each droplet using correspondence matching. For each row (each droplet) of current_box, the system executes a process such as illustrated in FIG. 13 to extract the descriptor for each droplet. Thus, the current_descriptor is a two dimensional array with six columns and the number of rows is equal to the number of droplets, in an embodiment.

current_tracker: This variable stores the information about the droplets that are being tracked by the present system including: [y_min, x_min, y_max, x_max, p, A, E, T, $\vec{x}_{k|k}$, loss, tracking_id, success, flatten($P_{k-1|k-1}$)], where the first four elements are the coordinates of the bounding box, tracking_id is the unique ID assigned to each droplet to count the total number of droplets; loss stores the number of times a particular droplet is not matched with a new droplet in a new frame as the present method moves forward in time. If the droplet is rematched with a droplet in a new frame, the value of loss is set back to zero. Thus, loss acts as a buffer when the correspondence matching fails, and the present system does not immediately discard the droplet but predicts a new state of the droplet in subsequent frames as discussed above; success stores the number of times a droplet has been matched to a new droplet from a new frame; flatten($P_{k-1|k-1}$) flattens the matrix $P_{k-1|k-1}$ into a one-dimensional row vector by appending each row to the end of another row. Thus, current_tracker contains information needed to execute the Kalman Filter prediction and update for all currently tracked droplets. Each row of current_tracker corresponds to a droplet, in an embodiment.

Figure 15:
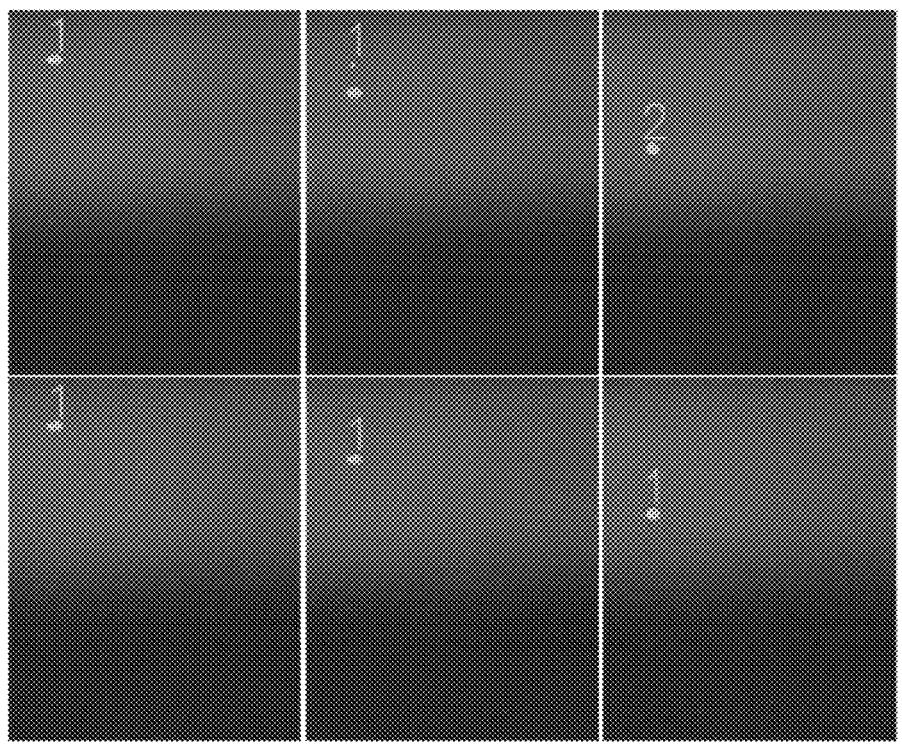

FIG. 15 illustrates results obtained with and without a Kalman filter prediction block, in one example of the present subject matter. In FIG. 15, the top row shows the result obtained without a Kalman filter prediction block, and the bottom row shows the result with a Kalman filter prediction applied to undetected droplets. FIG. 15 further illustrates the role of Kalman filter prediction in tracking. In FIG. 15, the top row results are obtained when the Kalman filter prediction is not applied, and the bottom row results are obtained with the Kalman filter prediction. The first row shows a droplet being detected. The second row shows that the object is not detected. As a result, when system does not produce a prediction, the algorithm assumes the current position of the droplet to be the last known position. When the droplet is again detected in the last column, the cost value is higher than the threshold, thus the algorithm labels the droplet as a new droplet. However, this is not the case with prediction, since even when the droplet is not detected in the second column, the prediction block predicts the undetected droplet position. As a result, when the droplet is detected in the third column, the matches with the predicted location in an embodiment.

Figure 16:
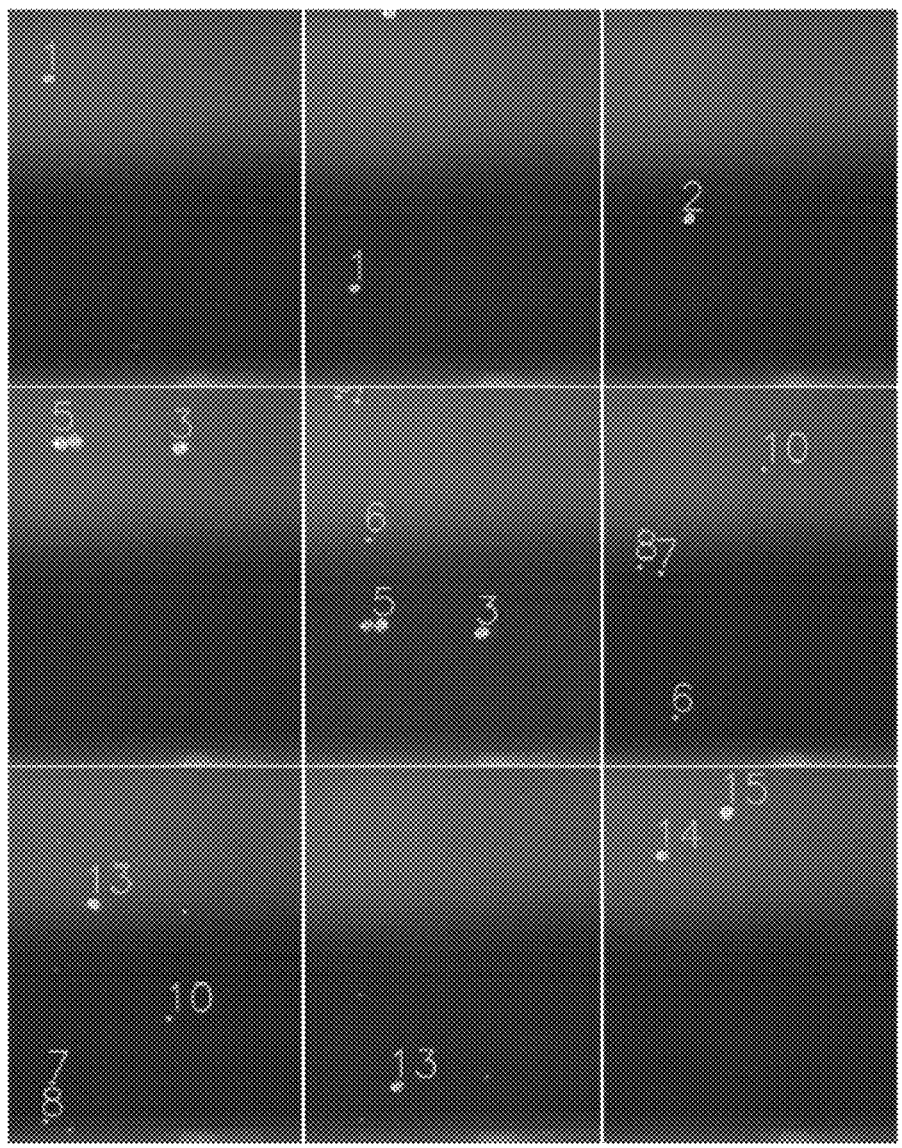

FIG. 16 illustrates an instance of object tracking represented through a sequence of frames, in one example of the present subject matter. In FIG. 16, moving left to right along the columns and top to bottom along the row, droplets are depicted being tracked and assigned a unique ID as their motion progresses through the respective image frames. In various embodiments, image frames can be extracted from the input video and passed to the present system and steps of detecting and tracking the droplets are executed. As an example, FIG. 16 shows the droplets being tracked in multiple frames, to illustrate successful detection for input frames. As can be seen in the FIG. 16, tracking smaller droplets (approximately covering 0.03% or less of total image area) is more challenging, but the present subject matter tracks a majority of droplets and assigns a unique ID to each of them.

The system and method of the present subject matter applies deep learning for droplet detection, by detecting droplets and extracting their geometric characteristics. In various embodiments, the system uses least square fitting of an ellipse to each detected droplet, and geometric characteristics of detected droplets are extracted. In various embodiments, the object detector model of the present subject matter is trained until the accuracy of around 90% is achieved. Thus, the ability to detect droplets seems to be limited by the training data available. The present subject matter further provides for tracking droplets among successive image frames. For smaller droplets in the frame (approximately covering 0.03% or less of total image area), it becomes relatively harder to track as such droplets are harder to detect. The present subject matter provides for user control over parameters that affect the performance of detection tracking of the droplets, in various embodiments.

Computational Machine

Figure 17:
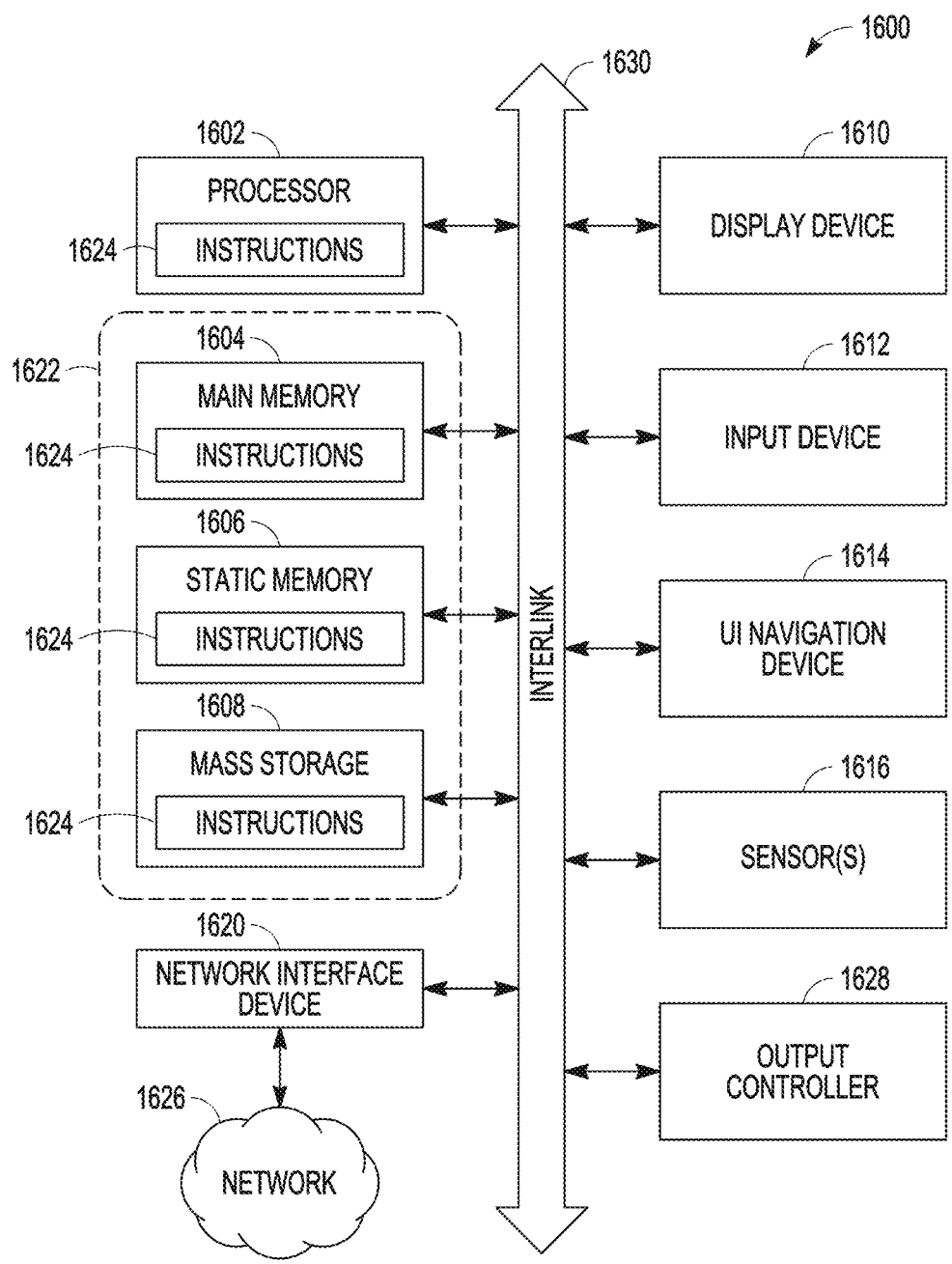

FIG. 17 illustrates a block diagram of an example machine 1600 upon which any one or more of the techniques (e.g., methodologies) discussed herein can perform. Examples, as described herein, can include, or can operate by, logic or a number of components, or mechanisms in the machine 1600. Circuitry (e.g., processing circuitry) is a collection of circuits implemented in tangible entities of the machine 1600 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1600 follow.

In alternative embodiments, the machine 1600 can operate as a standalone device or can be connected (e.g., networked) to other machines. In a networked deployment, the machine 1600 can operate in the capacity of a server machine, a client machine, or both in server-client network environments. In an example, the machine 1600 can act as a peer machine in peer-to-peer (P2P) (or other distributed) network environment. The machine 1600 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1600 can include a hardware processor 1602 (e.g., a central processing unit (CPU), a graphics processing unit (GPU), a hardware processor core, or any combination thereof), a main memory 1604, a static memory (e.g., memory or storage for firmware, microcode, a basic-input-output (BIOS), unified extensible firmware interface (UEFI), etc.) 1606, and mass storage 1608 (e.g., hard drive, tape drive, flash storage, or other block devices) some or all of which can communicate with each other via an interlink (e.g., bus) 1630. The machine 1600 can further include a display unit 1610, an alphanumeric input device 1612 (e.g., a keyboard), and a user interface (UI) navigation device 1614 (e.g., a mouse). In an example, the display unit 1610, input device 1612 and UI navigation device 1614 can be a touch screen display. The machine 1600 can additionally include a storage device (e.g., drive unit) 1608, a network interface device 1620, and one or more sensors 1616, such as a global positioning system (GPS) sensor, compass, accelerometer, or other sensor. The machine 1600 can include an output controller 1628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1602, the main memory 1604, the static memory 1606, or the mass storage 1608 can be, or include, a machine readable medium 1622 on which is stored one or more sets of data structures or instructions 1624 (e.g., software) embodying or utilized by any one or more of the techniques or functions described herein. The instructions 1624 can also reside, completely or at least partially, within any of registers of the processor 1602, the main memory 1604, the static memory 1606, or the mass storage 1608 during execution thereof by the machine 1600. In an example, one or any combination of the hardware processor 1602, the main memory 1604, the static memory 1606, or the mass storage 1608 can constitute the machine readable media 1622. While the machine readable medium 1622 is illustrated as a single medium, the term "machine readable medium" can include a single medium or multiple media (e.g., a centralized or distributed database, and/or associated caches and servers) configured to store the one or more instructions 1624.

The term "machine readable medium" can include any medium that is capable of storing, encoding, or carrying instructions for execution by the machine 1600 and that cause the machine 1600 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media can include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1624 can be further transmitted or received over a communications network 1626 using a transmission medium via the network interface device 1620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device 1620 can include one or more physical jacks (e.g., Ethernet, coaxial, or phone jacks) or one or more antennas to connect to the communications network 1626. In an example, the network interface device 1620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1600, and includes digital or analog communications signals or other intangible medium to facilitate communication of such software. A transmission medium is a machine readable medium.

Additional Notes & Examples

Example 1 is a system for detection and tracking of droplets sprayed from a nozzle, the system comprising: a sensor configured to observe droplets sprayed from the nozzle; a frame extractor module configured to obtain data from the sensor; a droplet shape and size extraction module configured to extract information from the data obtained by the frame extractor module; a droplet tracking module configured to track individual droplets using the information extracted by the droplet shape and size extraction module; and a data log module configured to store a list of droplets and information associated with the droplets.

In Example 2, the subject matter of Example 1 includes, wherein the frame extractor is configured to extract frames from an input video at a fixed frame rate as defined by a user.

In Example 3, the subject matter of Examples 1-2 includes, wherein the droplet shape and size extraction module is configured to extract geometric information about detected droplets in a current frame provided by the frame extractor module.

In Example 4, the subject matter of Examples 1-3 includes, wherein the droplet tracking module is configured to track droplets by matching the droplets between frames based upon information obtained from a new frame which has been processed by the droplet shape and size extraction module.

In Example 5, the subject matter of Examples 1-4 includes, wherein the data log module is configured to store a list of droplets and information associated with the droplets, including one or more of: position in a current frame, position in a previous frame, shape and size of each droplet in the current frame, parameters of a dynamic model associated with each droplet, a numerical value that counts a number of times each droplet has been matched continuously with previous frames referred to as success value, a numerical value that counts a number of times each droplet has not been matched with previous frames referred to as loss value, or a unique identifier for each droplet.

In Example 6, the subject matter of Example 3 includes, wherein the droplet shape and size extraction module is configured to output droplet shape information, the droplet shape and size extraction module including: a frame noise suppression module using a Gaussian filter; an object detection module configured to determine a detected droplets confidence score and corresponding bounding box coordinates by executing a trained deep neural network model; a refinement module configured to select droplets having a confidence value above a user-defined threshold; a least square-based ellipse fitting module configured to provide information associated with a fitted ellipse for the selected droplets; and an extraction module configured to extract information by fitting an ellipse to detected droplets and transmit the information to the droplet tracking module.

In Example 7, the subject matter of Example 3 includes, wherein the droplet shape and size extraction module includes a neural network configured to refine droplet image data, the droplet shape and size extraction module including: a feature extraction module including a deep neural network with convolution operations that learns to recognize important features in an image to allow the deep neural network to distinguish droplets; a region proposal network including a second neural network that receives an output from the feature extraction module and identifies and outputs proposed regions in a feature map that contain an object; a region of interest (ROI) pooling module configured to make all of the proposed regions a same size; and an inference network including connected layers that take reshaped region proposal regions as an input and output the droplets and their corresponding bounding box, and further outputs a confidence score for each of the detected droplets in the image, wherein the confidence score is a numerical value within a range of 0 and 1 that is configured to filter out detections having confidence scores below a user-defined threshold, which are decarded as not being droplets.

In Example 8, the subject matter of Example 6 includes, wherein accuracy of the trained model is evaluated using images in a set $\Omega$ as defined in an equation:

$$\frac{1}{n(\Omega)}\sum_{k=1}^{n(\Omega)}\frac{T_{Dx}}{T_{Dx}+F_{Dx}+M_{Dx}},$$

where a total number of images in the set $\Omega$ is represented using $n(\Omega)$, $M_{Dx}$ is a total number of droplets missed by the trained model for an image when compared to its ground truth, $F_{Dx}$ is a total number of incorrect detections made by the trained model for the image when compared to its ground truth, $T_{Dx}$ is a true detection which is computed by subtracting a total number of droplets detected by the trained model for the image with the total number of incorrect detections for the image.

In Example 9, the subject matter of Example 8 includes, wherein the ground truth includes manually labeled data used for network training, including a bounding box around each droplet in the image.

In Example 10, the subject matter of Example 8 includes, wherein the accuracy of the trained model is configured to be used to guide a training process of the trained model, and wherein the training process of the model is stopped when the accuracy is greater than or equal to 90%.

In Example 11, the subject matter of Example 10 includes, wherein the training process is not limited to real data of droplets, and the training process is configured to use generated images of droplets using generative models during the training of the neural network model used for droplet detection.

In Example 12, the subject matter of Examples 1-11 includes, wherein the tracking module includes a multi-step process comprising droplet matching and sharing of outputs with the data log module.

In Example 13, the subject matter of Example 12 includes, wherein the droplet matching includes: computing a cost between new droplets and past droplets that are stored in the data log module; applying a Hungarian algorithm to determine a unique match between new droplets and past droplets that are stored in data log module; and providing refinement and grouping of droplets that are matched between past droplets and new droplets obtained by applying the Hungarian algorithm.

In Example 14, the subject matter of Example 13 includes, wherein the refinement and grouping of droplets that are matched between past droplets and new droplets includes: for each match between new droplets and past droplets: if the cost is below a user-defined threshold, accept each pair and update information for matched droplets based upon the information from the new droplet; and if the cost is above the user-defined threshold then: for unmatched droplets stored in the data log module: update information for unmatched droplets using a Kalman filter for predicting a position of the unmatched droplets in a next frame; and for unmatched droplets detected in a current frame: append each of the unmatched droplets detected in the current frame into the data log if a number of detected droplets in the current frame is greater than the number of droplets in the data log.

In Example 15, the subject matter of Example 14 includes, wherein updating information for matched droplets includes: copy current location information of a past droplet into past location information of the past droplet, including replacing the current location information of a past droplet with location information of a new droplet; update shape and size of each droplet of the past droplet with the shape and size information of the new droplet; update parameters of a dynamic model stored for the past droplet; increase a first numerical value by one that counts a number of times the past droplet has been matched continuously in previous frames; and update a second numerical value to zero that counts a number of times the past droplet has not been matched continuously in previous frames.

In Example 16, the subject matter of Example 14 includes, wherein updating information for unmatched droplets includes the following steps for each droplet pair of a new droplets and a past droplet: copy current location information of the past droplet into past location information of the past droplet, and replace the current location information with a Kalman filter prediction location of each droplet in the next frame; update shape and size of each droplet of the past droplet with the shape and size information of the new droplet; update a numerical value to zero that counts a number of times the past droplet has been matched continuously in previous frames; and update a loss value with an increment of one.

In Example 17, the subject matter of Example 14 includes, wherein the appending includes appending information into the data log module associated with each droplet, including: position in the current frame is stored based upon the information extracted from droplet shape and size extraction module; position in a previous frame is left empty; shape and size of each droplet in the current frame is stored based upon the information extracted from droplet shape and size extraction module; parameters of a dynamic model associated with each droplet use the dynamic model; a first numerical value that counts a number of times each droplet has been matched continuously with previous frames referred to as success value is set to zero; a second numerical value that counts a number of times each droplet has not been matched with previous frames referred to as loss value is set to zero; and a unique identifier for each droplet is added.

In Example 18, the subject matter of Example 9 includes, wherein droplet tracking updates values stored in the data log module, including determining whether a droplet current position is outside an image frame, and if so to removing the droplet and its associated characteristics from the data log.

In Example 19, the subject matter of Examples 1-18 includes, wherein the system is configured to repetitively detect and track droplets for image frames extracted by a frame extractor.

In Example 20, the subject matter of Examples 1-19 includes, further comprising a nozzle controller configured to control function of the nozzle to implement feedback control of nozzle output based on the information associated with the droplets.

In Example 21, the subject matter of Examples 1-20 includes, wherein at least a portion of the system is incorporated into an agricultural machine.

Example 22 is a method for detection and tracking of droplets sprayed from a nozzle, the method comprising: observing droplets sprayed from the nozzle using one or more sensors; obtaining data from the one or more sensors by examining a frame from the one or more sensors; extracting information from the data obtained from the one or more sensors regarding a droplet shape and size; tracking individual droplets using the information extracted regarding the droplet shape and size; and storing a list of droplets and information associated with the droplets in a data log.

In Example 23, the subject matter of Example 22 includes, further comprising repetitively detecting and tracking droplets from image frames.

In Example 24, the subject matter of Examples 22-23 includes, further comprising tracking droplets by matching the droplets between frames based upon information obtained from a new frame.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

Each of the non-limiting aspects or examples described herein may stand on its own or may be combined in various permutations or combinations with one or more of the other examples.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A system for detection and tracking of droplets sprayed from a nozzle, the system comprising:
   a sensor configured to observe droplets sprayed from the nozzle;
   a frame extractor module configured to obtain data from the sensor;
   a droplet shape and size extraction module configured to extract information from the data obtained by the frame extractor module;
   a droplet tracking module configured to track individual droplets using the information extracted by the droplet shape and size extraction module; and
   a data log module configured to store a list of droplets and information associated with the droplets,
   wherein the droplet tracking module is configured to update values stored in the data log module, including determining whether a current position of an individual droplet is outside an image frame, and when the current position is outside the image frame, removing the individual droplet and information associated with the individual droplet from the data log module.

2. The system of claim 1, wherein the frame extractor module is configured to extract frames from an input video at a fixed frame rate as defined by a user.

3. The system of claim 1, wherein the droplet shape and size extraction module is configured to extract geometric information about detected droplets in a current frame provided by the frame extractor module.

4. The system of claim 1, wherein the droplet tracking module is configured to track droplets by matching the droplets between frames based upon information obtained from a new frame which has been processed by the droplet shape and size extraction module.

5. The system of claim 1, wherein the data log module is configured to store a list of droplets and information associated with the droplets, including one or more of: position in a current frame, position in a previous frame, shape and size of each droplet in the current frame, parameters of a dynamic model associated with each droplet, a numerical value that counts a number of times each droplet has been matched continuously with previous frames referred to as success value, a numerical value that counts a number of times each droplet has not been matched with previous frames referred to as loss value, or a unique identifier for each droplet.

6. The system of claim 3, wherein the droplet shape and size extraction module is configured to output droplet shape information, the droplet shape and size extraction module including:
   a frame noise suppression module using a Gaussian filter;
   an object detection module configured to determine a detected droplets confidence score and corresponding bounding box coordinates by executing a trained deep neural network model;
   a refinement module configured to select droplets having a confidence value above a user-defined threshold;
   a least square-based ellipse fitting module configured to provide information associated with a fitted ellipse for the selected droplets; and
   an extraction module configured to extract information by fitting an ellipse to detected droplets and transmit the information to the droplet tracking module.

7. The system of claim 3, wherein the droplet shape and size extraction module includes a neural network configured to refine droplet image data, the droplet shape and size extraction module including:
   a feature extraction module including a deep neural network with convolution operations that learns to recognize important features in an image to allow the deep neural network to distinguish droplets;
   a region proposal network including a second neural network that receives an output from the feature extraction module and identifies and outputs proposed regions in a feature map that contain an object;
   a region of interest (ROI) pooling module configured to make all of the proposed regions a same size; and
   an inference network including connected layers that take reshaped region proposal regions as an input and output the droplets and their corresponding bounding box, and further outputs a confidence score for each of the detected droplets in the image, wherein the confidence score is a numerical value within a range of 0 and 1 that is configured to filter out detections having confidence scores below a user-defined threshold, which are decarded as not being droplets.

8. The system of claim 6, wherein accuracy of the trained model is evaluated using images in a set Ω as defined in an equation:

$$\frac{1}{n(\Omega)} \sum_{x=1}^{n(\Omega)} \frac{T_{Dx}}{T_{Dx} + F_{Dx} + M_{Dx}}$$

where a total number of images in the set 22 is represented using n(Ω), $M_{DX}$ is a total number of droplets missed by the trained model for an image when compared to its ground truth, Fox is a total number of incorrect detections made by the trained model for the image when compared to its ground truth, $T_{DX}$ is a true detection which is computed by subtracting a total number of droplets detected by the trained model for the image with the total number of incorrect detections for the image.

9. The system of claim 8, wherein the ground truth includes manually labeled data used for network training, including a bounding box around each droplet in the image.

10. The system of claim 8, wherein the accuracy of the trained model is configured to be used to guide a training process of the trained model, and wherein the training process of the model is stopped when the accuracy is greater than or equal to 90%.

11. The system of claim 10, wherein the training process is not limited to real data of droplets, and the training process is configured to use generated images of droplets using generative models during the training of the neural network model used for droplet detection.

12. The system of claim 1, wherein the tracking module includes a multi-step process comprising droplet matching and sharing of outputs with the data log module.

13. The system of claim 12, wherein the droplet matching includes:
  computing a cost between new droplets and past droplets that are stored in the data log module;
  applying a Hungarian algorithm to determine a unique match between new droplets and past droplets that are stored in data log module; and
  providing refinement and grouping of droplets that are matched between past droplets and new droplets obtained by applying the Hungarian algorithm.

14. The system of claim 13, wherein the refinement and grouping of droplets that are matched between past droplets and new droplets includes:
  for each match between new droplets and past droplets:
  if the cost is below a user-defined threshold, accept each pair and update information for matched droplets based upon the information from the new droplet; and
  if the cost is above the user-defined threshold then:
  for unmatched droplets stored in the data log module:
    update information for unmatched droplets using a Kalman filter for predicting a position of the unmatched droplets in a next frame; and
  for unmatched droplets detected in a current frame:
  append each of the unmatched droplets detected in the current frame into the data log if a number of detected droplets in the current frame is greater than the number of droplets in the data log.

15. The system of claim 14, wherein updating information for matched droplets includes:
  copy current location information of a past droplet into past location information of the past droplet, including replacing the current location information of a past droplet with location information of a new droplet;
  update shape and size of each droplet of the past droplet with the shape and size information of the new droplet;
  update parameters of a dynamic model stored for the past droplet;
  increase a first numerical value by one that counts a number of times the past droplet has been matched continuously in previous frames; and
  update a second numerical value to zero that counts a number of times the past droplet has not been matched continuously in previous frames.

16. The system of claim 14, wherein updating information for unmatched droplets includes the following steps for each droplet pair of a new droplets and a past droplet:
  copy current location information of the past droplet into past location information of the past droplet, and replace the current location information with a Kalman filter prediction location of each droplet in the next frame;
  update shape and size of each droplet of the past droplet with the shape and size information of the new droplet;
  update a numerical value to zero that counts a number of times the past droplet has been matched continuously in previous frames; and
  update a loss value with an increment of one.

17. The system of claim 14, wherein the appending includes appending information into the data log module associated with each droplet, including:
  position in the current frame is stored based upon the information extracted from droplet shape and size extraction module;
  position in a previous frame is left empty;
  shape and size of each droplet in the current frame is stored based upon the information extracted from droplet shape and size extraction module;
  parameters of a dynamic model associated with each droplet use the dynamic model;
  a first numerical value that counts a number of times each droplet has been matched continuously with previous frames referred to as success value is set to zero;
  a second numerical value that counts a number of times each droplet has not been matched with previous frames referred to as loss value is set to zero; and
  a unique identifier for each droplet is added.

18. The system of claim 1, wherein the system is configured to repetitively detect and track droplets for image frames extracted by a frame extractor.

19. The system of claim 1, further comprising a nozzle controller configured to control function of the nozzle to implement feedback control of nozzle output based on the information associated with the droplets.

20. The system of claim 1, wherein at least a portion of the system is incorporated into an agricultural machine.

21. A method for detection and tracking of droplets sprayed from a nozzle, the method comprising:
  observing droplets sprayed from the nozzle using one or more sensors;
  obtaining data from the one or more sensors by examining a frame from the one or more sensors;
  extracting information from the data obtained from the one or more sensors regarding a droplet shape and size;

tracking individual droplets using the information extracted regarding the droplet shape and size;

storing a list of droplets and information associated with the droplets in a data log; and updating values stored in the data log, including determining whether a current position of an individual droplet is outside an image frame, and when the current position is outside the image frame, removing the individual droplet and information associated with the individual droplet from the data log.

22. The method of claim 21, further comprising repetitively detecting and tracking droplets from image frames.

23. The method of claim 21, further comprising tracking droplets by matching the droplets between frames based upon information obtained from a new frame.

* * * * *